FIG. 2.

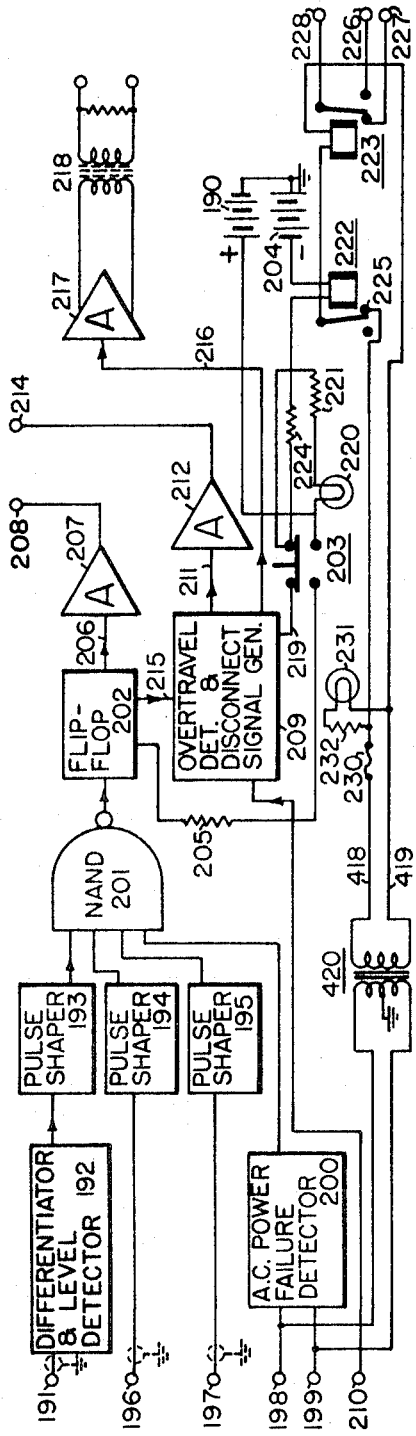
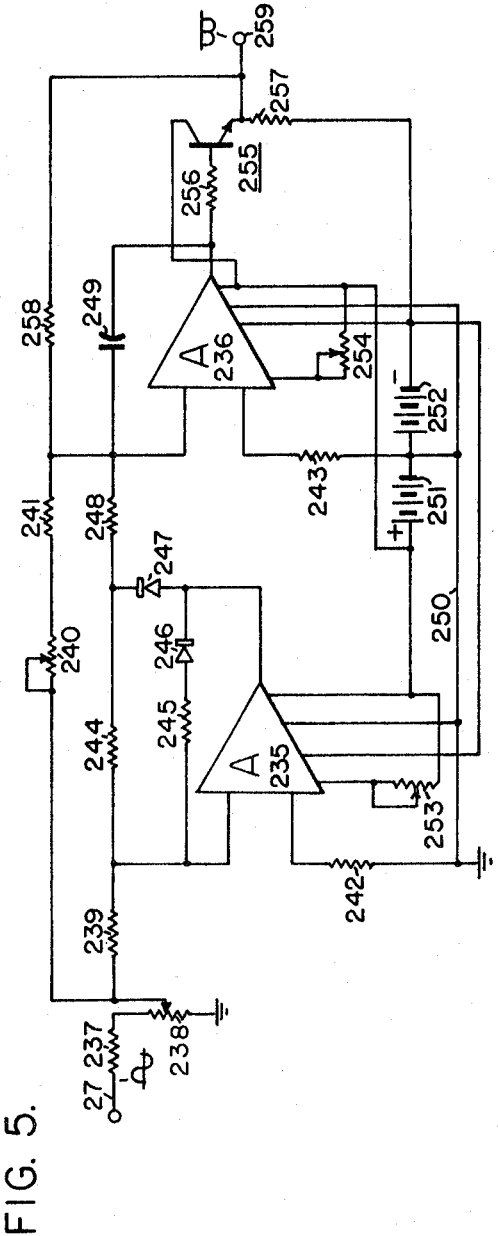
FIG. 4.
FIG. 5.
INVENTORS
JAMES A. ROSS
THEODORE F. BOGART, JR.
BY Harry R. Lubcke
AGENT INVENTORS
JAMES A. ROSS
THEODORE F. BOGART, JR.
BY *Harry R. Lubcke*
AGENT INVENTORS
JAMES A. ROSS
THEODORE F. BOGART, JR.
BY Harry R. Lubcke
AGENT INVENTORS
JAMES A. ROSS
THEODORE F. BOGART, JR.
BY
*Harry R. Lubcke*
AGENT INVENTORS
JAMES A. ROSS
THEODORE F. BOGART, JR.
BY Harry R. Lubcke
AGENT INVENTORS
JAMES A. ROSS
THEODORE F. BOGART, JR.
BY Harry R. Lubcke
AGENT 3,463,984
CONTROLLED DECELERATION SYSTEM FOR
VIBRATION APPARATUS
James A. Ross, Villa Park, Calif., and Theodore F.
Bogart, Jr., Tucson, Ariz., assignors to LTV Ling
Altec, Inc., Anaheim, Calif., a corporation of
Delaware
Filed June 10, 1966, Ser. No. 556,761
Int. Cl. H02p 5/04, 5/46, 7/80
U.S. Cl. 318—127    17 Claims

ABSTRACT OF THE DISCLOSURE

An electrical control for decelerating a moving system, in which means is automatically adjusted during deceleration. This accomplished deceleration as gradually as possible considering the initial conditions imposed; i.e., the velocity of the moving system and the distance available for accomplishing deceleration. Motional parameters are fed to a computer, the output of which provides information for adjusting the deceleration means. Deceleration at a selected value is possible, also for any of a plurality of operational hazards.

---

Figure 1:
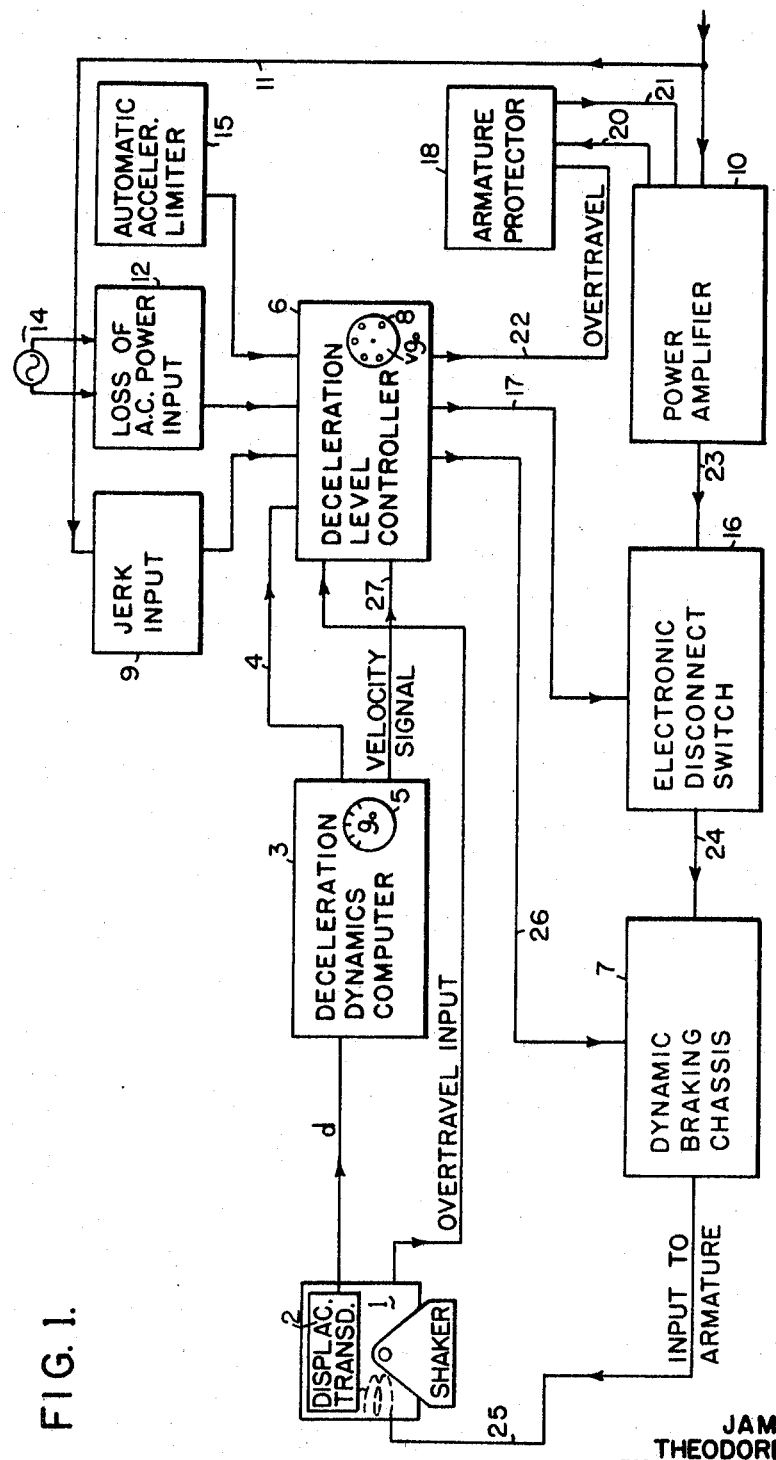

This invention pertains to an electrical system for bringing a moving system to rest in a gradual manner. More specifically, the system includes an electronic computer, electronic switching means and electronic dynamic braking means to automatically compute the instantaneous deceleration required to bring the moveable element of a vibration apparatus to rest and to accomplish this deceleration automatically upon selected conditions being fulfilled. Even more specifically, the system acts to decelerate an armature of an electrodynamic vibrator, or "shaker," upon the occurrence of an energy transient in such a manner that the armature shall not strike physical stops and shall not be subjected to more than a selected deceleration. Since the specimen being tested is invariably attached to the armature, this controlled deceleration ystem is a sophisticated safety device.

The prior art has a accomplished deceleration of an armature by merely inserting a very small fixed value of damping resistance across the same. This results in a decelerating force that is inversely proportional to the instantaneous velocity of the armature. It will be realized that with such an arrangement the deceleration will be a maximum at the start of deceleration and will reduce as the armature comes to rest. This is not a method which gives minimum deceleration for accomplishing the task.

In contradistinction thereto, according to this invention a calculation is continuously made by an electronic computer is accordance with the instantaneous displacement and velocity of the armature as to the deceleration that would be experienced if deceleration was initiated at that instant. This value of deceleration is continuously compared electrically with a selected value of deceleration, which may be set by the operator as the maximum deceleration he wishes to tolerate. This setting may include a safety factor of his choice. When the deceleration required to bring the armature to ret just exceeds that selected, deceleration is automatically initiated.

Further, the value of armature velocity is monitored as deceleration occurs and when this drops significantly below selected values the apparatus according to this invention electronically switches-in further resistors in parallel with the resistor or resistors initially connected across the armature to initiate deceleration. This process is repeated a few times, as is required to maintain a substantially constant value of deceleration until the armature is brought to rest. Thus, the initial value of deceleration may be considerably lower than would be required with the simple mode of deceleration of the prior art that has been described. It will be understood that the whole deceleration process takes place in a very small fraction of a second. Thus, an entirely automatic system is required.

In normal operation of a vibration system the deceleration limit set by the operator will not be exceeded. However, the arc-over of a vacuum tube in the driving power amplifier, or the excitation of a mechanical resonance of the specimen-armature entity such as results in an excessive acceleration, are illustrative of conditions which bring the controlled deceleration system of this invention into operation.

Briefly, the invention embraces a relative displacement transducer attached to the armature, which transducer generates an electrical signal proportional to the position of the armature relative to the body of the shaker. A deceleration dynamics computer employs this signal and also forms the first derivative of it; this being velocity. This computer also, in effect, solves the equation $$g = \frac{v^2}{772s}$$

which gives the minimum deceleration $g$ to bring the armature to rest in a distance $s$ when it has a velocity $v$. This computer also compares an electrical value corresponding to the above equation to the operator-selected $g$ level. Should the former exceed the latter, the computer produces an electrical pulse.

This pulse is passed on to a deceleration level controller, which device continually computes control signals for a plurality of armature-shorting resistor circuits. When the operator-selected $g$ level is exceeded by the deceleration required to bring the armature to rest this controller selects the number and the sequence of resistors that are to be connected across the armature winding to decelerate the armature at a minimum constant $g$ according to this invention. This deceleration level controller also accepts other electrical inputs signifying abnormal operating conditions based upon fault-producing parameters for which deceleration is required.

Control signals from the deceleration level controller are supplied to an electronic disconnect switch and to a dynamic braking chassis. The former disconnects the armature from the energizing means, or driving power-amplifier; and the latter electronically connects the actual low-valued resistors across the armature in sequence, as has been explained.

The objects of this invention are to provide:
a method and means for decelerating a moving system to rest at any epoch involving the displacement and velocity of the system;
a method and means for bringing a moving system to rest with a selected, fixed deceleration short of a fixed barrier to motion;
a method and means for accomplishing a fixed deceleration by altering the conditions affecting deceleration during the period of deceleration;
a method and means for safely vibrating a specimen under conditions of deceleration as well as under conditions of acceleration; and
a method and means for operating a vibrating system wherein deceleration resistors are electronically connected in sequence to accomplish dynamic braking.

Figure 2:
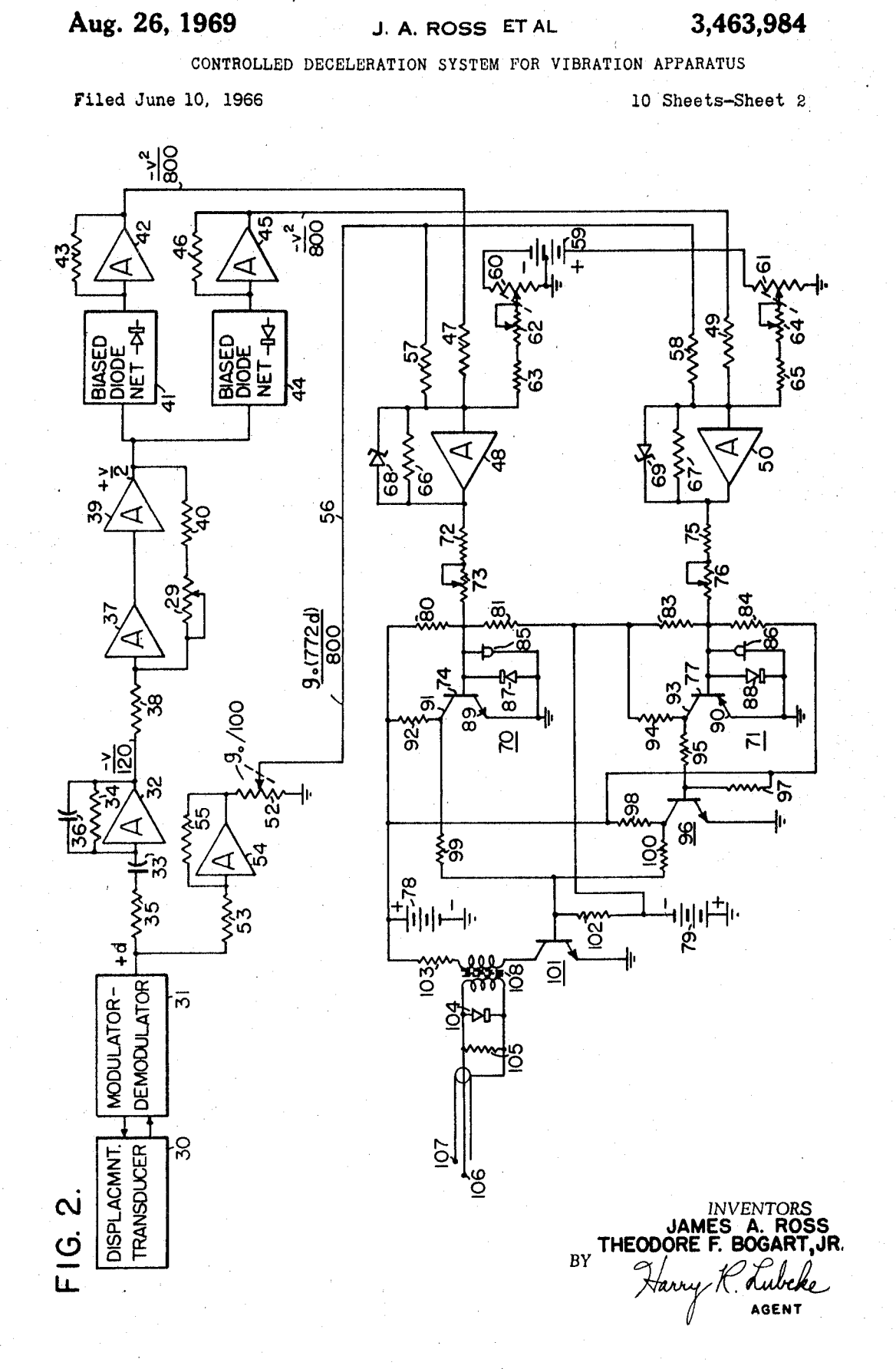

Other objects will be apparent upon examining the following specification and drawings, in which are set forth by way of example certain embodiments of the invention.
FIG. 1 is a block diagram of the system according to this invention, FIG. 2 is a block and schematic diagram of the deceleration dynamics computer, FIG. 3 is a block and schematic diagram of that part of the deceleration level controller which processes the signal that is proportional to armature velocity.

Figure 3:
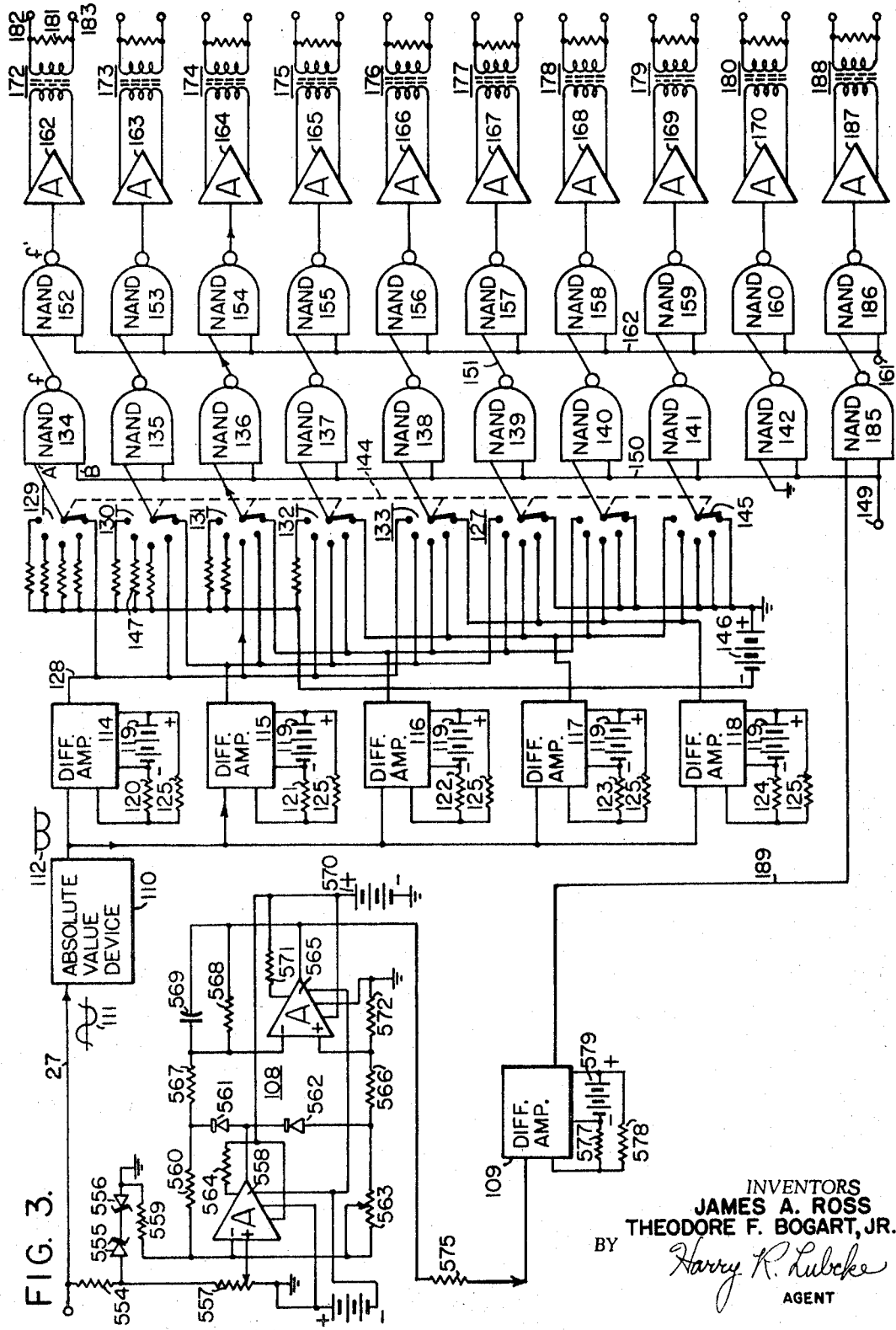

FIG. 4 is a block and schematic diagram of that part of the deceleration level controller which processes the trigger signal from the deceleration dynamics computer and from similar inputs to the system, FIG. 5 is a schematic diagram of the absolute value device of FIG. 3.

Figure 6:
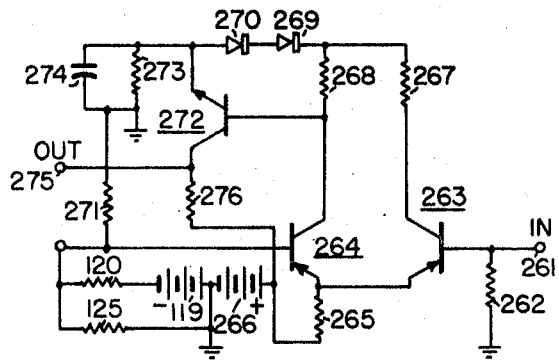
Figure 7:
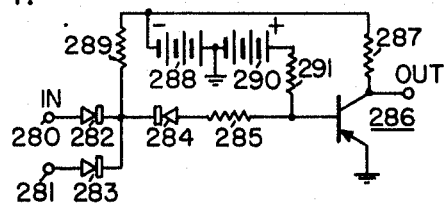
Figure 8:
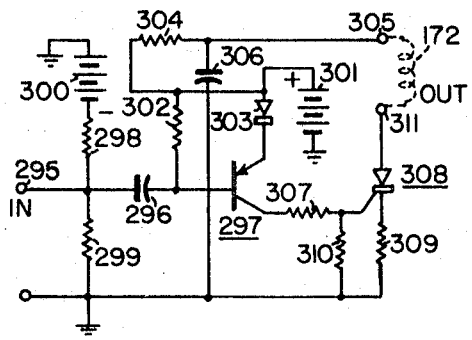
Figure 9:
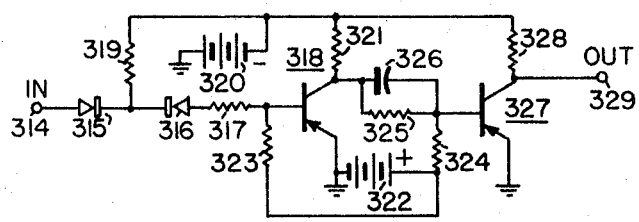
Figure 10:
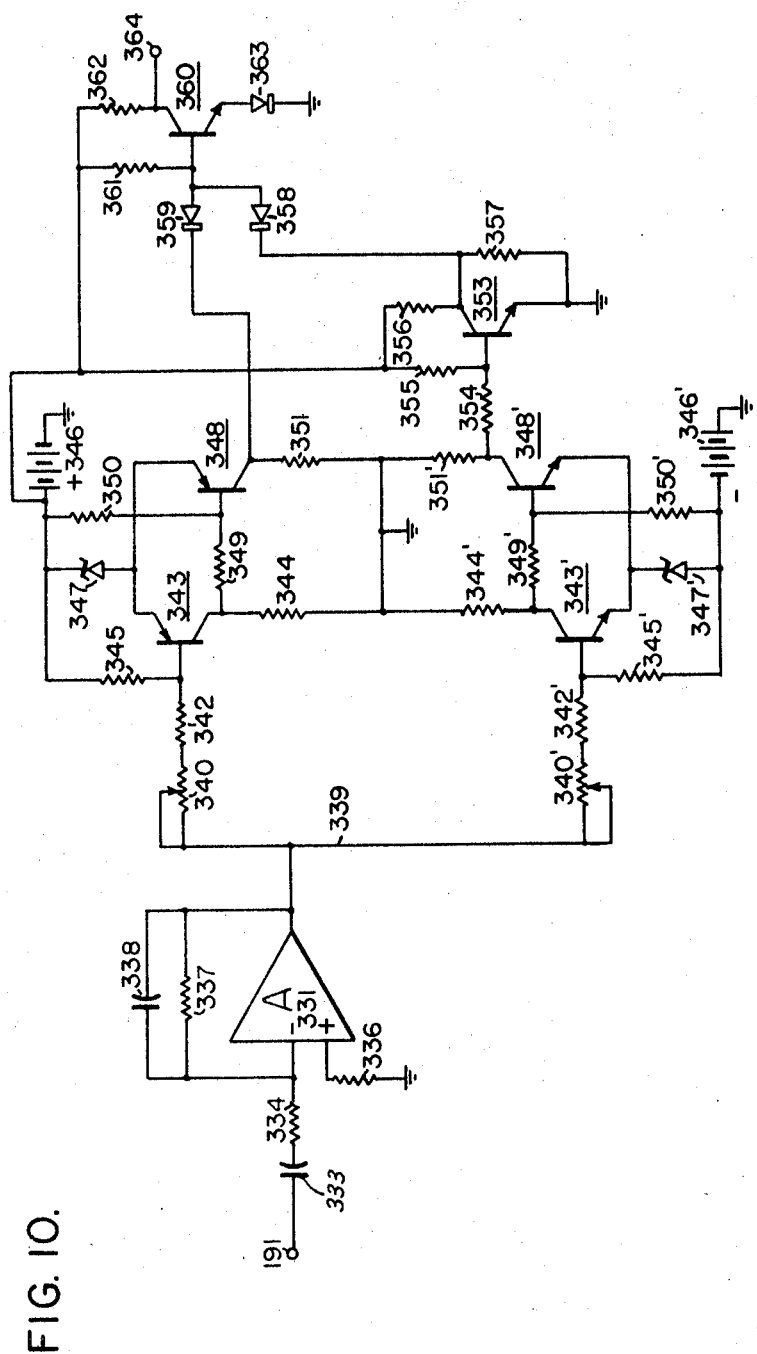
Figure 11:
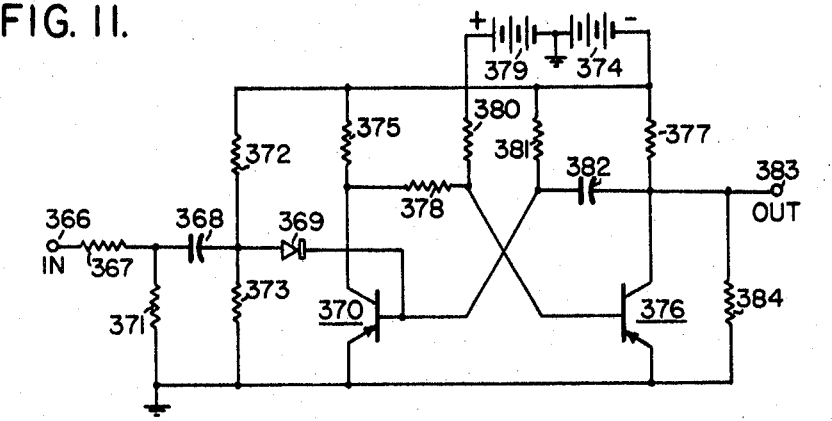
Figure 12:
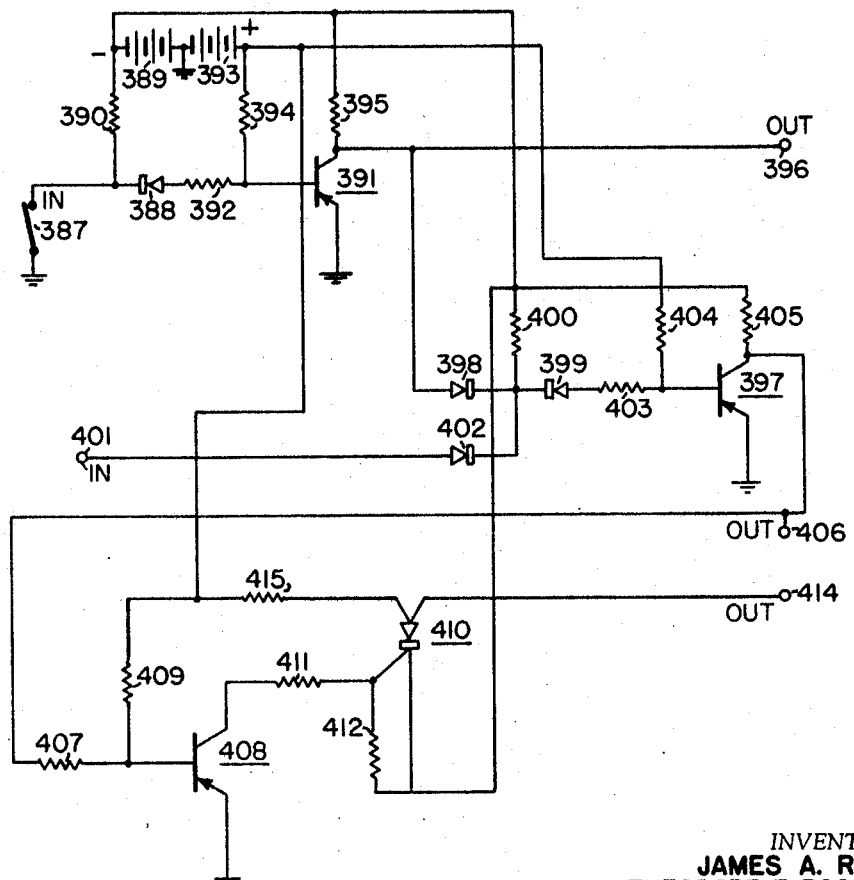
Figure 13:
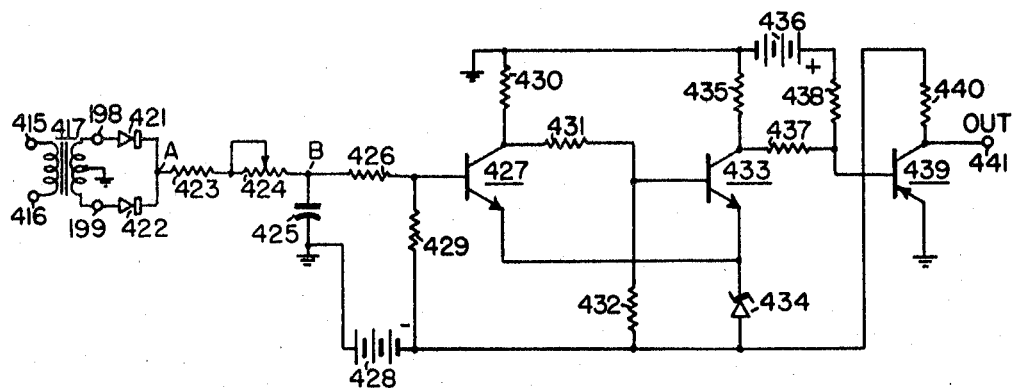
Figure 14:
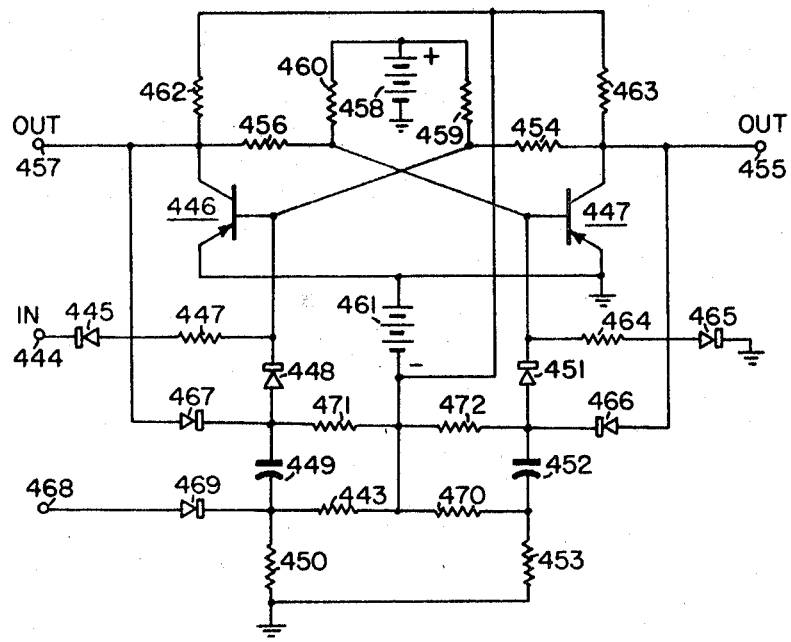
Figure 15:
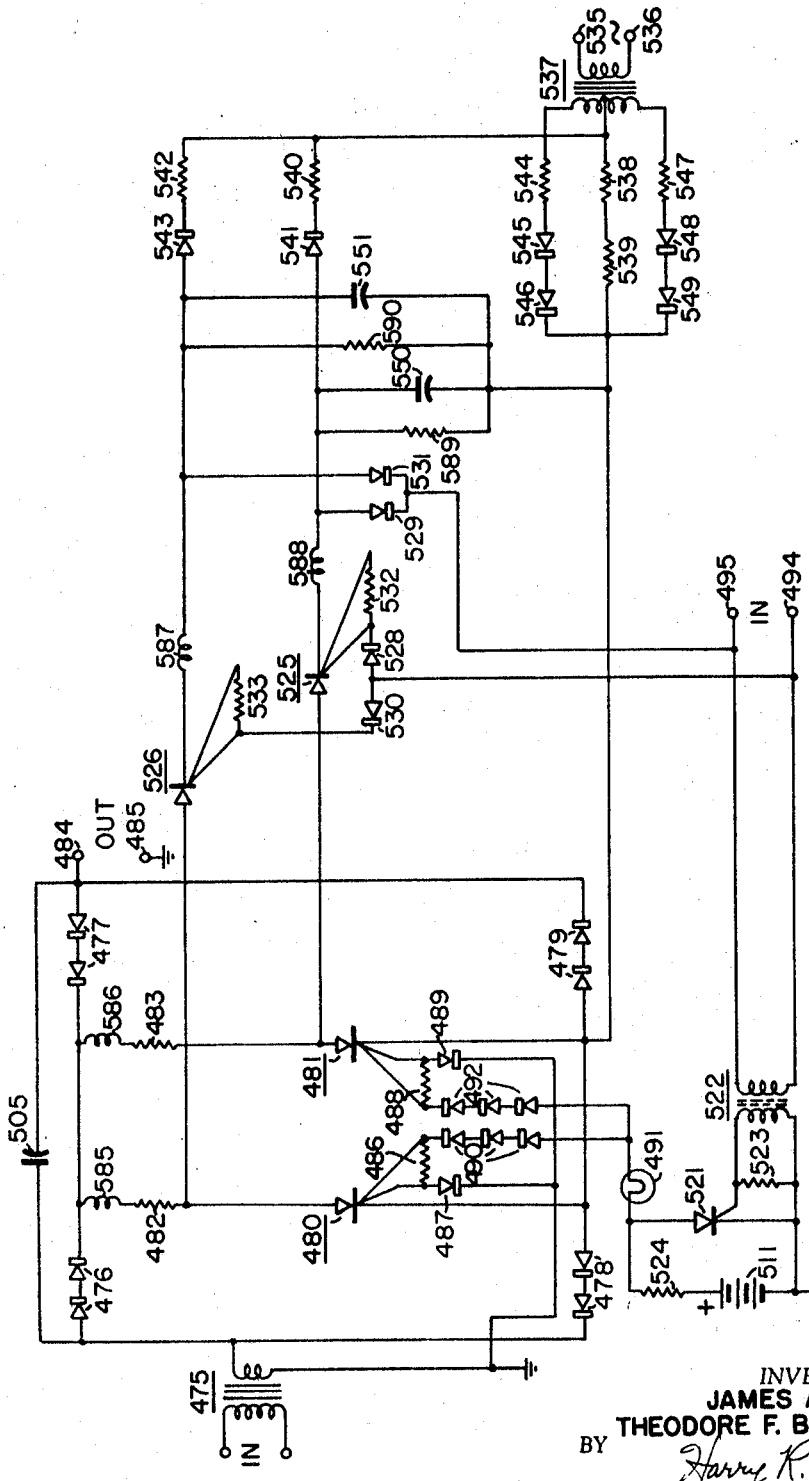
Figure 16:
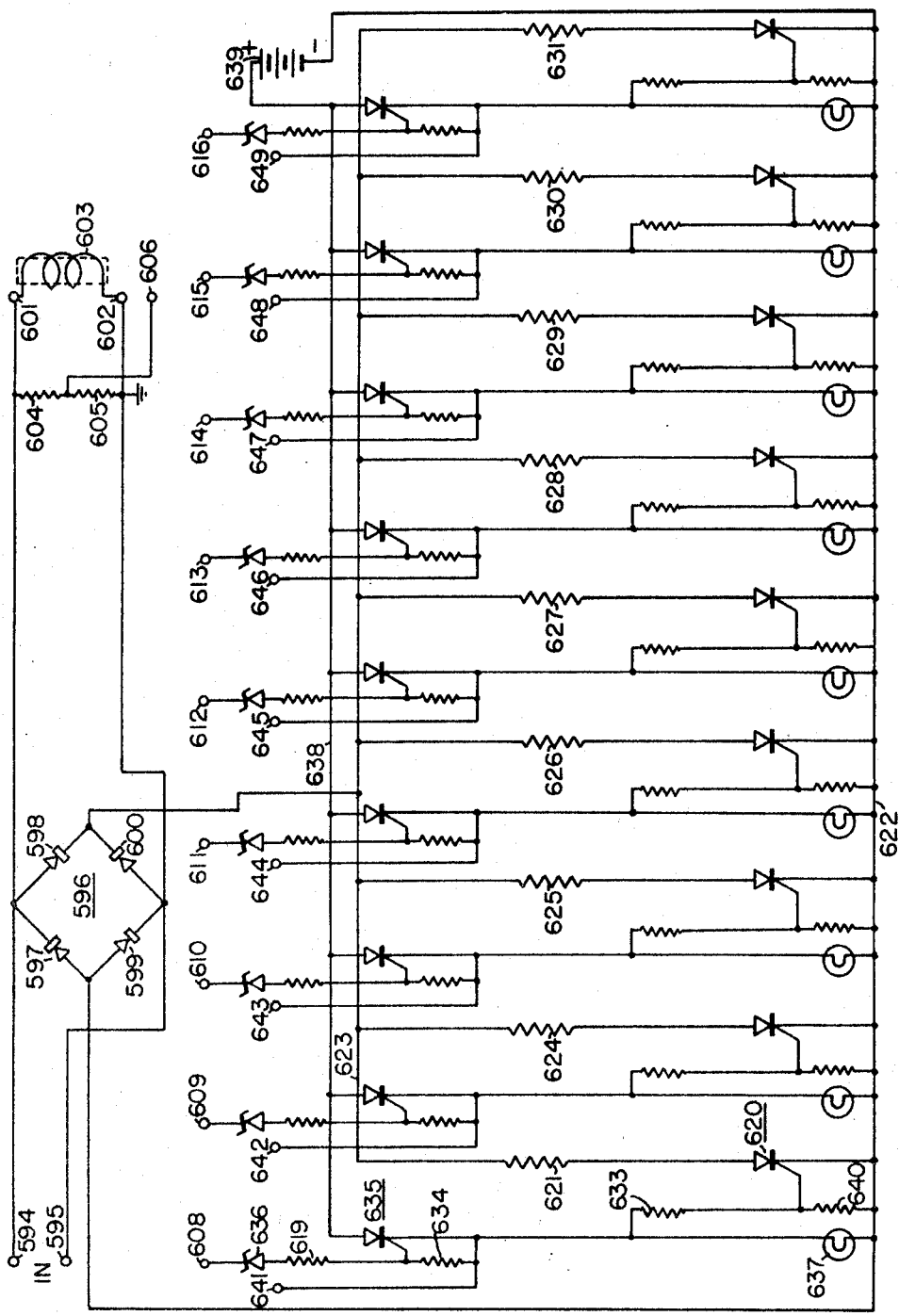

FIG. 6 is a schematic diagram of a typical voltage comparator ("Differential Amplifier") as employed in FIG. 3, FIG. 7 is a schematic diagram of a typical NAND gate as employed in FIG. 3, FIG. 8 is a schematic diagram of a typical pulse amplifier as employed in FIG. 3, FIG. 9 is a schematic diagram of a typical amplifier as employed in FIG. 4, FIG. 10 is a schematic diagram of the differentiator and level detector as employed in FIG. 4, FIG. 11 is a schematic diagram of a typical pulse shaper as employed in FIG. 4, FIG. 12 is a schematic diagram of the overtravel detector and disconnect signal generator as employed in FIG. 4, FIG. 13 is a schematic diagram of an alternating current power failure detector as employed in FIG. 4, FIG. 14 is a schematic diagram of the flip-flop memory as employed in FIG. 4, FIG. 15 is a schematic diagram of the electronic disconnect switch, and FIG. 16 is a schematic diagram of the dynamic breaking chassis.

In order that the mathematical equivalent of the various items of apparatus and the mode of functioning thereof shall be clear the mathematical analysis of the physics involved in bringing a body to rest is given.

The classical dynamics equation involved is:

$$v_t^2 - v_0^2 = 2as \qquad (1)$$

where:

$v_f$=final velocity
$v_0$=initial velocity
$a$=acceleration
$s$=distance

Since the body is to be brought to rest, $v_f=0$.

Expressing $2a$ in terms of $g$, the well-known acceleration due to gravity, and using inches for the unit of distance $s$, and inches per second for the unit of velocity, Equation 1 becomes:

$$g = \frac{-v_0^2}{772s} \qquad (2)$$

The negative sign signifies deceleration.

Equation 2 thus states that a constantly applied deceleration, which is proportional to the square of the initial velocity and is inversely proportional to $s$, is required to bring a body to rest in a distance $s$.

A selected deceleration of magnitude such as to provide a safe slowing down of the specimen under test may be given the notation $g_0$ in Equation 2. By multiplying both sides of Equation 2 by $772s$ and employing the selected value $g_0$, we obtain:

$$-g_0(772s) = v_0^2 \qquad (3)$$

This is the logic that is implemented by the deceleration dynamics computer. The deceleration $-g_0$ is constant for any given test, being set by the operator. When $v_0^2$ exceeds the magnitude of the left-hand side of the Equation 3 an output pulse is produced by the deceleration dynamics computer and this pulse actuating further entities of the system brings the armature and the specimen affixed thereto for vibration test to rest short of the physical stops provided for the armature on the stationary structure of the shaker.

The distance $s$ in Equation 3 when applied to the motion of the armature of a shaker will be recognized as the distance between a given position of the armature at a given instant and that stop attached to the stationary structure of the shaker in the direction in which the armature is moving. This may have a value of more or less than the distance between the central rest position of the armature and either of the positions of the stops, which are equidistant from the rest position, depending upon the direction of motion at the instant selected for examination.

If the distance $d$ is therefore defined as the instantaneous position of the armature from the rest position and a fixed distance $k$ as the distance from the rest position to each stop, then $s$ is $(k-d)$.

In order to employ voltages of desired magnitude in relation to the operating voltages of transistors, Equation 3 is divided on both sides by a constant approximately equal to 800.

Making these transformations in Equation 3 there results:

$$\frac{v^2}{800} = \frac{g_0(772d)}{800} - \frac{g_0(772k)}{800} \qquad (4)$$

These terms are continuously evaluated and compared by the deceleration dynamics computer, as will be detailed later. When the $v^2$ term is greater than the sum of the difference terms an output pulse is delivered by the computer. In passing, it may be remarked that Equation 4 has the form of a parabola with $v$ and $d$ as variables. How successive connection of shunting resistors across the armature for decelerating the same approximates a parabola will later be shown.

Turning now to a description of the system, in FIG. 1 numeral 1 represents an electrodynamic vibrator, or shaker. This is a known device, which provides reciprocatory motion, typically weighs hundreds of pounds, and is capable of accepting kilowatts of alternating current power input upon an armature winding. This winding constitutes the load upon the electrical system and the specimen to be tested constitutes the mechanical load upon the armature; and it is for the purpose of vibrating the specimen that the whole system is utilized.

A stationary field structure surrounds the armature winding and a constant magnetic flux from the field structure interacts with alternating current in the armature winding to provide motion in synchronism with the alternating current. This device may be termed electro-magnetic means, and the whole shaker a reciprocatory exciter.

The frequency of the alternating current is normally chosen to lie within the range of from sub-audible frequencies to the relatively high audible frequencies. On certain tests a variable frequency sweep oscillator is employed and a significant fraction of the possible frequency range is fairly rapidly swept. The specimen is, of course, rigidly mechanically attached to the armature structure.

Displacement transducer 2 is mechanically connected between the moveable armature and the stationary field structure of the shaker. It provides an electrical output proportional to the displacement of the armature from a central rest position. Displacement transducer 2 provides the instantaneous value of the variable $d$ in Equation 4.

The functioning of deceleration dynamics computer 3 has been largely described above. It accepts the input $d$ and the selected value of $g_0$, which value is chosen by the operator at control dial 5. The velocity-squared variable is synthesized by differentiating the $d$ input and then squaring it. When the $v^2$ term is greater than the difference terms at the right of Equation 4, an output pulse is delivered via conductor 4 to deceleration level controller 6.

Deceleration level controller 6 continuously computes control signals for a plurality of armature-shorting resistor circuits that are located in dynamic braking chassis 7. When the operator-selected level $g_0$ is exceeded and an output is obtained from computer 3, the results of this continuous computation are allowed to pass from the control circuits within controller 6 to the appropriate power circuits in braking chassis 7.

There are provided, for example, a plurality of nine armature-shorting resistors and corresponding circuits. Depending upon the epoch at which deceleration is initiated and with consideration of the velocity at that time of the armature, a selection of, for example, five of the armature-shorting resistors is made in order to bring the armature to rest with a minimum substantially constant deceleration. This selection is guided by a front of panel control 8, which control actuates a five position multiple pole switch. This switch connects to the selection circuits and has a parameter, the product of velocity by deceleration. The smallest value of this product may be, for example, 0 to 200 and the largest may be 1600 to 3200, with each range increasing by a factor of two greater than the terminal value of the range next below it.

The value of deceleration used in computing the product of velocity by deceleration to set switch 8 is the actual deceleration maintained by the device, and, in general, this deceleration level will be greater by some safety factor than the deceleration level $g_0$ that is set into control 5 on the deceleration dynamics computer 3.

In addition to the triggering input delivered to the deceleration level controller from deceleration dynamics computer 3 it is desirable to include subsidiary inputs from certain fault-detecting means. This enhances the protection afforded the armature and the specimen.

One such subsidiary input is the "jerk" input, indicated as block 9 in FIG. 1. A jerk is defined as a time rate of change of acceleration and may arise from a transient or "spike" of voltage that is accidentally impressed upon the input of power amplifier 10 of the system. The circuit of block 9 is typically included within the chasis of deceleration level controller 6 in practice. It continuously computes the time rate of change of the amplifier drive signal. When this time-rate-of-change (derivative) exceeds a preset value a controlled deceleration is initiated. Conductor 11 conveys an input from element 10 to element 9 in FIG. 1. In practice, of course, such conductors as 11 are each composed of a pair of conductors, which are often shielded as well. Alternately, the conductor shown may be comprised of one conductor with a ground connection through the several connected chassis as the return conductor.

Another subsidiary input of the fault signal type to the deceleration level controller and also typically physically within the chassis of the same is the "loss of A. C. power input" 12. It will be realized that if the electric power should cease the safety controls exercised by the several devices shown in FIG. 1 would cease. Thus, an abnormal condition of operation of the armature of shaker 1 could easily develop before electrical and/or mechanical energy would cease as the whole system became inoperative. An illustrative source of power 14 is shown feeding device 12, which source may be a transformer with the primary thereof connected to the main power line supplying all of the rest of the system.

Still another subsidiary input is the "automatic acceleration limiter" 15. This entity monitors the acceleration level at an arbitrarily selected point on the specimen under test, as by means of an accelerometer. If, due to a resonant condition within the specimen itself, the acceleration exceeds some preset level, then a pulse is generated and this is used to initiate a controlled deceleration through deceleration level controller 6. It is thus seen that an "enabling" pulse from any of the devices 3, 9, 12 or 15 will initiate controlled deceleration by means of controller 6.

Power amplifier 10 is a known entity, usually employing at least two high power vacuum tubes in a push-pull circuit and receiving audio frequency electrical power at low energy level from known driver amplifier stages. These have not been shown, nor has the oscillator or equivalent source of alternating electrical energy, since these are also known. However, because of its high power capability, power amplifier 10 possesses considerable stored power at essentially every instant of its operation and therefore must be disconnected from the armature of shaker 1 when any emergency arises.

It is for this reason that electronic disconnect switch 16 is connected to the output of power amplifier 10 in FIG. 1. Device 16 is comprised of four rectifying diodes connected in a bridge circuit, with a controllable conductive means; i. e., a silicon controlled rectifier (SCR), across the diagonal of the bridge. Control circuits are provided to cause the SCR to conduct during normal operation, but not to conduct when the power amplifier is to be disconnected from the armature. A suitable electrical pulse is delivered from controller 6 to disconnect switch 16 via conductor 17 to accomplish the disconnection.

An "armature protector" 18 is presently included as a part of the present system to protect power amplifier 10 in the event of a gas burst in a power vacuum tube, or an equivalent breakdown if solid state power amplifying devices are used in the power amplifier. An armature protector is described in U.S. Patent No. 2,935,671, granted May 3, 1960 to James A. Ross, which patent may be referred to for further details.

The information required to form the gas burst signal is conveyed from power amplifier 10 to armature protector 18 via conductor 20. The control exerted by the armature protector upon the power amplifier is exercised via conductor 21. As will be further explained, overtravel control exercised by the deceleration level controller 6 upon armature protector 18 is accomplished via conducl tor 22.

When the system is in vibratory operation the power from the power amplifier passes to the disconnect switch via conductor 23 and from there to dynamic braking chassis 7 via conductor 24, and from there to the armature of shaker 1 via conductor 25. When the system is decelerating the power amplifier is disconnected from the armature at switch 16 and dynamic braking is effected upon the armature by chassis 7 via conductor 25.

Braking chassis 7 contains the power resistors and actuating circuits for selectively shorting across the armature under the selection made in deceleration controller 6 and impressed via conductor 26. Each actuating circuit is comprised of a silicon controlled rectifier, which accepts the control signal ffrom controller 6 on its control electrode, and, being connected in series with the power resistor it is to short across the armature, does so by assuming a conductive state. Previously non-conducting, it removes the resistor from across the armature and so allows the armature to be powered from power amplifier 10 for normal operation.

Conductor 27 conveys the velocity signal formed in deceleration dynamics computer, as has been described above, to deceleration level controller 6, where it is employed as required, as for latching.

The "overtravel input" conductor connects from shaker 1 to deceleration level controller 6 in FIG. 1. Within the shaker there are located switches operable by extreme excursions in either direction of the armature; i.e., overtravel switches. These are actuated as a last resort, when for some reason all prior protective apparatus has not acted. When an overtravel switch is actuated, this causes the deceleration level controller to open electronic disconnect switch 16, fire the "dump" SCR's in armature protector 18 to protect power amplifier 10, and fire all of the braking SCR's in dynamic braking chassis 7. This all occurs simultaneously, as an emergency measure. In this instance the armature is decelerated in a manner less than ideal, but as rapidly as possible so as to prevent damage to the shaker 1.

Turning now to FIG. 2, displacement transducer 30 provides a displacement signal input to the deceleration dynamics computer, with which this figure is concerned. Transducer 30 is a known commercially obtainable device. It employs a transformer having a moveable core, which core is attached to the armature of shaker 1. Modulator-demodulator 31 is cross-connected with transducer 30; to energize it with an unmodulated alternating current of, say, 3,000 Hertz (cycles per second) and to receive back a signal of the same frequency, but amplitude modulated with the motion of the armature with respect to the stationary structure of the shaker. Demodulator 31 then demodulates this signal, thus to supply only the displacement signal itself at "$+d$." The Automatic Timing and Controls, Inc., model Nos. 62236 and 6101–E, devices may be employed for elements 30 and 31, respectively.

The signal level at $+d$ is of the order of 1 volt per inch of deflection of the armature. This signal is differentiated by the elements comprising operational amplifier 32 and components externally associated therewith. A signal proportional to $dd/dt$ is formed; the rate of change of displacement with time. Amplifier 32 may be one of the commercially available transistorized operational amplifiers, such as the Burr-Brown model 1508, which has an open loop gain of 90 db, an input D.C. offset of $\pm 0.5$ millivolts, and a temperature stability of $\pm 25$ microvolts/° C.

This amplifier is provided with external elements such that a differentiator with a double roll-off is formed; that is, the amplitude vs. frequency characteristic does not rise to great heights at high frequency, but at frequencies above those actually employed in the operation of this system the characteristic returns toward zero. This is to prevent false operation should the signal $+d$ have spurious high frequency "noise" for any reason.

The differentiation itself is accomplished by capacitor 33 and resistor 34. The roll-off is provided by resistor 35 and capacitor 36. Elements 33 and 35 are connected in series at the input of amplifier 32 and may have values of 0.1 microfarad ($\mu$f.) and 820 ohms, respectively. Elements 34 and 36 are connected in parallel across the amplifier, from input to output, and may have values of 82,000 ohms and 0.001 $\mu$f., respectively. The signal level output of amplifier 32 is of the order of 0.01 volt per inch per second and may have the designation $-v./120$ in the notation used to trace the signal in FIG. 2.

This signal is then amplified of the order of 60 times by the series combination of amplifiers 37 and 39, after passing through isolating resistor 38, of 10,000 ohms. Amplifier 37 may be the Burr-Brown model 1542 operational amplifier. The output thereof is connected to the input of direct-coupled driver amplifier 39, which does not invert the signal polarity. The signal then has an amplitude and a character represented by $+v/2$. Feedback for both amplifiers 37 and 39 is provided by variable resistor 29 of 200,000 ohms maximum resistance and fixed resistor 40, 500,000 ohms. These are connected in series and from the input of amplifier 37 to the output of amplifier 39. Adjustment of resistor 29 allows setting the velocity sensitivity to precisely $v/2$; i.e., 0.5 volt/inch/second.

The combination of biased diode network 41 and operational amplifier 42 comprises a squaring amplifier; i.e., the output signal therefrom is proportional to the mathematical square of the input signal. This type of amplifier is known. In the showing in FIG. 2, a plurality of diodes, say ten, have the polarity shown by the illustrative single diode. The anode of each is connected to the input and each is differently biased. Each diode has a resistor associated with it, which is connected in series with the input to the amplifier. The feedback resistor 43 for the amplifier 42 has a constant value. Thus, as the input signal increases in amplitude, more and more diodes conduct, thereby decreasing the series resistance value and increasing the amplification so that the amplitude of the output of the amplifier is the square of the amplitude of the input. The elements 41, 42 may be provided by a single commercially obtainable squaring amplifier, such as the Burr-Brown model 1644. Also, this technique is treated in the book, "Analog and Digital Computer Technology," Norman Scott, McGraw-Hill, 1960, pp. 73–78, particularly FIG. 3.14; Library of Congress No. 60–8843.

Elements 44, 45, 46 are the same as elements 41, 42, 43, except that the polarity of the diodes in element 44 is opposite to that in element 41. This provides a signal of always negative polarity at the output of amplifier 42 and always positive polarity at the output of amplifier 45. This is so that the desired squared characteristic will be obtained on both positive and negative parts of each cycle of the alternating current input to the squaring amplifiers. This separate treatment of the signal is carried forward in the remainder of this computer channel and a single output is obtained therefrom at a terminating OR gate.

The amplitude and nature of the signal at the outputs of squaring amplifiers 42 and 45 is rperesented by $-v^2/800$. The output from amplifier 42 passes through a summing resistor 47, of 100,000 ohms, and to the input of operational amplifier 48. Similarly, the output from amplifier 45 passes through a summing resistor 49, of 100,000 ohms, and to the input of operational amplifier 50.

We now turn to a separate branch of the computer of FIG. 2, in which potentiometer 52 is a front-of-panel control by means of which the operator sets the maximum deceleration he wishes to allow in bringing the armature of shaker 1 to rest. This branch takes a feed of the displacement signal $+d$ from the output of element 31, where it passes through a series resistor 53, of 10,000 ohms resistance, and thence to operational amplifier 54, which may be a chopper-stabilized Burr-Brown model 1644. Feedback resistor 55 is connected from the output to the input of this amplifier and may have a value of 1 megohm. The gain through amplifier 54 is thus of the order of 100 times.

The value of the signal at the output of amplifier is $-772d/8$. Potentiometer 52 has a total resistance of 10,000 ohms. In signal nomenclature it has a value of $g_0/100$; that is, the ratio of the potentiometer is to be multiplied by 100 to give the "$g$'s" for the deceleration selected. For a ratio of 0.5, $g_0=50$ g's. The signal value output from this branch is the product of the two prior signal values. At conductor 56, which connects to the adjustable slider on potentiometer 52, this value is:

$$g_0(772d)/800 \qquad (5)$$

This is identical to one term on the right side of the previously derived Equation 4, thus showing how the mathematical expression is obtained electrically.

Conductor 56 connects to both of the summing junctions at the inputs of amplifiers 48 and 50, through 100,000 ohm resistors 57 and 58, respectively.

A D.C. potential is also entered into each summing junction. The source of this potential is represented in FIG. 2 by battery 59. This battery has a voltage of negative 120 volts connected toward amplifier 48 and of positive 120 volts connected toward amplifier 50. These connections are accomplished through potentiometers 60 and 61, respectively; each having a total resistance of 10,000 ohms and each mechanically ganged as to its adjustable slider with the adjustable slider of equivalent potentiometer 52. This ganging provides a single front panel control and in FIG. 2 the ganging is indicated by a section of dotted line across each variable slider contact.

Potentiometers 60 and 61 coact with potentiometer 52 to provide a D.C. voltage which is proportional to $\mp g_0/100$. The potential from each of potentiometers 60 and 61 is modified slightly by adjustable resistor 62 in series with fixed resistor 63 in a connection from the slider of potentiometer 60 to the summing input at amplifier 48, and by adjustable resistor 64 in series with fixed resistor 65 in a connection from the slider of potentiometer 61 to the summing input at amplifier 50, respectively. These variable resistors may each have a maximum resistance of 200,000 ohms and each fixed resistor a value of 200,000 ohms also. These resistors provide the required resistance for the summing junction and the adjustments allow for variation in the distance to the stops from one type of shaker to another.

It will be recognized that the outputs from squaring amplifiers 42 and 45 are proportional to $-v.^2/800$, the left hand side of Equation 4. The comparison as to which side of Equation 4 is the larger is thus made at the summing junctions at the inputs to amplifiers 48 and 50.

Amplifiers 48 and 50 may each be of the Burr-Brown 1644 model. Feedback resistors 66 and 67, respectively, may each have a resistance of 10 megohms. Across the input to output of amplifier 48 Zener diode 68 is connected, with the cathode to the input; while across amplifier 50 Zener diode 69 is similarly connected, but with the anode to the input. The Zener diodes clamp the outputs of the respective amplifiers at a nominal voltage, say 6 volts, to prevent saturation of the amplifier at large inputs and consequent failure of proper operation as a voltage comparator.

Except for possible modification by the term involving the dimensions of the shaker stops, when the $v^2$ term from amplifier 42 is larger than the $g_0 772d$ term from separate branch 56, and the signal is positive, a negative output is delivered from amplifier 48. Similarly, when the signal is in its negative half-cycle and the $v^2$ term is larger than the $g_0 772d$ term, then a positive output is delivered from amplifier 50. The polarities of these outputs do not have significance, since an OR gate to be later described accepts an output from either amplifier chain and provides an output from the computer regardless of internal polarities. The significant event is whether or not an *output* appears at either amplifier 48 or 50 during the controlling polarity of the half cycle which the signal may occupy at any given instant, since this signifies "danger" on either an upward or a downward excursion of the armature of shaker 1. An output is *not* obtained when the conditions of voltage amplitudes at the respective summing junctions add to zero, or to an output having a polarity opposite to that given above. The lack of output signifies, of course, that the deceleration required to stop the armature at that instant does not exceed the $g_0$ value that has been set into the apparatus by the operator.

Amplifier 48 is followed by level detector 70, while amplifier 50 is followed by level detector 71; each such detector being constructed to accept the significant polarity of the amplifier to which it is connected. Each level detector gives an output when a selected level is reached, but no output for any smaller signal level.

Fixed resistor 72, of 500 ohms, connects to the output of amplifier 48 and in series with variable resistor 73, of 2,000 ohms maximum resistance, to base 74 of the transistor of level detector 70. A fully equivalent structure occurs with respect to resistors 75 and 76, amplifier 50 and base 77. The variable resistor in each instance allows adjustment of the responses of the two level detectors so that the same are not sensitive to noise levels at the outputs of the amplifiers 48 and 50.

Two batteries, or equivalent regulated power supplies, 78 and 79 are provided, with the negative terminal of battery 78 connected to ground and with the positive terminal of battery 79 connected to ground. Each of these sources of voltage has the same voltage, say 15 volts. Bias resistor 80 connects between the positive terminal of battery 78 and base 74, while bias resistor 81 connects between the negative terminal of battery 79 and base 74. This results in essentially zero volts bias on base 74. Each of the resistors 80 and 81 have a typical resistance of 15,000. The relation of bias resistors 83 and 84 are exactly the same with respect to base 77, save that the polarity of the connections of the batteries to the resistors is reversed.

A tunnel diode 85, which may be of the 1N3940 type, is connected with cathode to base 74 and anode to ground; while tunnel diode 86 is connected in the reverse manner, with anode to base 77. The known bi-stable characteristic of tunnel diodes definitely turns on the transistors having bases 74 and 77, respectively, when a particular input voltage is reached across the tunnel diode. An ordinary diode 87 is shunted across tunnel diode 85 with the same polarity of cathode and anode as tunnel diode 85, and the same configuration is repeated with respect to ordinary diode 88 and tunnel diode 86. The ordinary diodes protect the base to emitter junctions of the transistors from excessive reverse voltage.

Emitter 89, associated with base 74 in an NPN transistor of the 2N1306 type, typically, is connected to ground; whereas emitter 90, associated with base 77 in a PNP transistor of the 2N404 type, is also connected to ground. Collector 91, associated with base 74 is connected to resistor 92, of 1,000 ohms, and thence to the positive terminal of battery 78, Collector 93, associated with base 77, is connected to resistor 94, of 1,000 ohms, and thence to the negative terminal of battery 79. Collector 93 is also connected to resistor 95, of 33,000 ohms, and thence to the base of phase-inverting transistor 96. A resistor 97, of 33,000 ohms, also connects to this base and to the positive terminal of battery 78. Resistor 98, of 1,000 ohms, connects from the collector of NPN transistor 96, of the 2N3053 type, to the positive terminal of battery 78.

The two resistors of the OR gate are resistors 99, connected to collector 91, and resistor 100, connected to the collector of transistor 96; each may have a resistance of 33,000 ohms and each connects to the base of NPN transistor 101. This transistor may be of the 2N3053 type. The base thereof is connected to resistor 102, of 33,000 ohms, and thence therethrough to the negative terminal of battery 79. The collector of transistor 101 connects first to the primary of pulse transformer 108 and therethrough to resistor 103, of 240 ohms, to the positive terminal of battery 78. The transformer may be a one-to-one ratio, as the type PE2231 of the Pulse Engineering Co.

Diode 104 is connected across the secondary of transformer 108 to insure that the pulse therefrom shall be unidirectional. Resistor 105 is also connected across the secondary, and may have a resistance of 1,000 ohms. The output from the deceleration dynamics computer appears, typically, at the conductors of a coaxial cable, such as 106 and 107, which conductors are connected to the extremities of the secondary of pulse transformer 108. These conductors comprise the connection 4, of FIG. 1, by means of which this computer 3 is connected to deceleration level controller 6.

FIG. 3 shows the part of the deceleration level controller which processes the signal that is proportional to the velocity of the armature of the shaker. Conductor 27 provides the voltage from deceleration dynamics computer for supplying armature velocity information. Since this voltage is alternating at the frequency of vibration of the armature and it is the absolute value of the voltage generated by the deceleration dynamics computer that is desired, an absolute value device 110 is connected to conductor 27. Device 110 is the equivalent of a precision full-wave rectifier. It employs two operational amplifiers and is detailed in FIG. 5. Waveform 111 in FIG. 3 is illustrative of the input to device 110 and waveform 112 is illustrative of the output of the same. The effect of full-wave rectification without filtering is seen.

Output 112 is impressed upon one input terminal of each of a plurality of differential amplifiers. In FIG. 3 this plurality is five; being elements 114 through 118. The other input to each differential amplifier is from a source of constant voltage, which has a different value of voltage for each differential amplifier. In FIG. 3 these sources are separately shown as a battery 119 in each of five places and having a voltage, for example, of $-12$ volts. In practice these may all be a connection to a regulated power supply of $-12$ volts output. Each differential amplifier has a voltage divider connected to its battery, such as resistors 120 through 124, each connected in series with an additional resistor 125 for each amplifier and across each battery 119. Typically, the negative terminal of each battery connects to one end of one resistor in the group 120 through 124, while the second terminal of each resistor 125 connects to the positive terminal of each battery 119. A typical resistance value for each resistor 125 is 255 ohms. The resistance values of the other resistors may be as follows; 120, 255 ohms; 121, 768 ohms; 122, 1,780 ohms; 123, 3,830 ohms; and 124, 7,870 ohms. These give voltages at the common connection of the resistors, which in each case is connected to the differential amplifier involved; of −6 volts to amplifier 114; −3 volts to amplifier 115; −1.5 volts to amplifier 116; −0.75 volt to amplifier 117; and −0.375 volt to amplifier 118.

Differential amplifiers 114 through 118 are the first in a group of multiple devices provided to select one or more decelerating resistors to be shunted across the armature winding of shaker 1, and to determine the sequence of resistors to be employed for any particular deceleration condition.

Each of the differential amplifiers 114 through 118 is operated without a feedback resistor. Thus, it will give an output going to saturation for a relatively small change in inputs. When the signal 112 input is greater than the reference input to a particular differential amplifier the same is "off" and gives an output in logical notation of "0." When the reverse is true the amplifier is "on" and gives a logical "1."

From what has gone before regarding the several biases, it will be seen that as deceleration starts, signal 112 will decrease to less than −6 volts in amplitude and so differential amplifier 114 will be turned "on," giving logical "1." Next in order, when signal 112 has decreased to just under 3 volts, amplifier 115 turns "on," giving logical "1." The same thing is repeated at 1.5 volts for amplifier 116, and so on. It will be seen that here is where the control originates for adding resistors in parallel across the armature winding as deceleration proceeds in order to maintain substantially constant deceleration according to this invention. In the particular apparatus employed, logical "0" is represented by 0 volts and logical "1" by −12 volts.

The output of each differential amplifier is distributed to five stationary contacts of eight pole five throw switch 127. For example, the output of amplifier 114, upon conductor 128, is connected to the bottom contact of the first pole; that is, switch wafer, 129, to the second contact of the second pole 130, to the third contact of the third pole 131, to the fourth contact of the fourth pole 132, and to the fifth (top) contact of the fifth pole 133.

As has been previously mentioned, switch 127 is a front of panel control calibrated in peak velocity times peak deceleration; i.e., $vxg_0$. The upper contact on each switch deck as these are shown in FIG. 3 corresponds to the 1,600 to 3,200 value, the next value counterclockwise is the 800 to 1,600 value, the next is the 400 to 800, the next is the 200 to 400, and the lowest contact is the 0 to 200 value.

With the connections from the outputs of the differential amplifiers to switch poles above-recited it is seen that when the switch has been set by the operator for the large velocity times deceleration value; i.e., 1,600 to 3,200, the outputs from four differential amplifiers 114 to 117 will be connected to the last four NAND gates from the top in FIG. 3; i.e., gates 138 through 141. Conversely, for a setting at the minimum value the top five NAND gates are connected; i.e., gates 134 through 138. The top NAND gate 134 ultimately connects to an armature-shunting resistor of maximum value, say 47 ohms, whereas the bottom NAND gate of this sequence, 141, ultimately connects to an armature-shunting resistor of minimum value, say 0.5 ohm. In this way, the deceleration that is first applied when the velocity is high is a moderate deceleration and is accomplished by connecting a fairly high value of resistance across the armature winding, whereas when the deceleration is lastly altered as to the resistors which cause it this value of deceleration will also be moderate. For the last phase of the deceleration a fairly low value of resistance will provide significant deceleration even though the velocity is small.

In switch 127 the dotted line 144 signifies a shaft mechanically ganging all of the switch arms, such as 145, for simultaneous actuation by one knob upon the front panel by the operator.

In addition to 24 connections from the outputs of the five amplifiers 114 through 118 to switch 127 according to the system set forth above there is also a set of negative voltage connections, 10 in number, from the negative terminal of battery 146; and of zero voltage, or ground, connections, 7 in number, from the positive (grounded) terminal of battery 146. Each of the negative connections has a resistor 147 of 22,000 ohms, for example, in series between the battery and the stationary contact of the switch. A suitable voltage for battery 146 is 12 volts. The purpose of the negative voltages is to give a logical "1"; i.e., −12 volts, to the NAND gate involved at the top of FIG. 3, when this gate is to be given this logic information for a certainty, such as for NAND gate 134 in the second through fifth positions at switch pole 129, and so on for the other switches receiving the negative voltage. The lower positions at the pole having switch arm 145 that are connected to ground are for the purpose of giving logical "0" to NAND gate 141, and so on in the manner set forth before.

TABLE I

| Switch position | $vxg_0$ | $g_0=2.5$ | | $g_0=5$ | | $g_0=10$ | | $g_0=20$ | | $g_0=40$ | |
|---|---|---|---|---|---|---|---|---|---|---|---|
| | | Velocity | Resistor No. | Velocity | Resistor No. | Velocity | Resistor No. | Velocity | Resistor No. | Velocity | Resistor No. |
| 1 | 0–200 | 80 | 1 | | | | | | | | |
| 2 | 200–400 | 40 | 2 | 80 | 1, 2 | | | | | | |
| 3 | 400–800 | 20 | 3 | 40 | 3 | 80 | 1, 2, 3 | | | | |
| 4 | 800–1,600 | 10 | 4 | 20 | 4 | 40 | 4 | 80 | 1, 2, 3, 4 | | |
| 5 | 1,600–3,200 | 5 | 5 | 10 | 5 | 20 | 5 | 40 | 5 | 80 | 1, 2, 3, 4, 5 |
| | | | | 5 | 6 | 10 | 6 | 20 | 6 | 40 | 6 |
| | | | | | | 5 | 7 | 10 | 7 | 20 | 7 |
| | | | | | | | | 5 | 8 | 10 | 8 |

Table I shows the relation between the position of switch 127, the instantaneous velocity of the armature, and the identifying number of the resistor that is initially shunted across the armature; also, the identifying numbers of the additional resistors that are subsequently also shunted across the armature. The first column gives the five switch positions which may be selected by the operator. The second column gives the velocity times deceleration product, the maximum value, corresponding to the switch positions. The third and fourth columns are grouped under the heading of $g_0=2.5$, which means that a relatively small deceleration value has been selected as all that will be allowed by the operator. Under this heading the velocity at the time of initiating deceleration is listed in column three and in column four the identifying number of the resistor involved is listed. The fifth and sixth columns are grouped under $g_0=5$, and so on for larger values of $g_0$, up to the value of $g_0=40$.

Interpreting the electronic process which the table represents; assuming the switch to be in position 1 and the instantaneous velocity being 80 inches/second at the initiation of deceleration, only resistor number 1 would be initially shunted across the armature. The power amplifier 10 has, of course, been automatically disconnected by electronic disconnect switch 16. Resistor 1 has the highest resistance value, for example, 47 ohms, and so decelerates the rapidly moving armature at a nominal deceleration, rather than at a high value of deceleration, as would occur should the usual lower value of resistor be shunted initially across the armature and remain so connected until the armature came to rest. As the identifying numbers of the resistors increase, the value of the resistor decreases, with resistor number 8 typically having a resistance of only a half ohm. The exact resistance value for each resistor in a practical embodiment is given in connection with the discussion of FIG. 16.

The showing of column 4 with the second resistor number 2 next below number 1, indicates that resistor number 2 is switched into the circuit in addition to resistor number 1 when the deceleration has reduced the velocity of the armature to 40 inches/second. Likewise, when the velocity has reduced to 20 inches/second resistor 3 is paralleled, when reduced to 10 inches/second resistor 4 is paralleled, and when reduced to 5 inches/second resistor 5 is paralleled.

Interpreting the table further, should the switch still be on position 1, but the velocity be 40 when deceleration is initiated, both resistors 1 and 2 would be immediately shunted across the armature. Likewise, should the switch position be 2 and the velocity a maximum of 40, both resistors 1 and 2 would be switched in circuit at once. Further, should the $g_0$ value be 5, the switch position 2 and the initial velocity be 80 inches/second, then both resistors 1 and 2 would be switched in circuit. Thereafter, the sequence of adding resistors would be 3, 4, 5, and 6. Note that in the last columns, under $g_0=40$, a large value of allowable deceleration, even for a maximum velocity of 80 inches/second, resistors 1, 2, 3, 4, 5 are all initially switched in circuit, with resistor 8 being the final one to be switched in (having a low resistance value).

It should be noted in using the table that $v_{(max)}$ times $g_0=400-800$ range, only the column headed $g_0=10$ and the entry of 80 inches/second is involved; i.e., resistors 1, 2, 3 are switched into the circuit. The column headed $g_0=20$ or the column headed $g_0=40$ are not involved since automatic acceleration limiter 15 of FIG. 1 will have previously initiated deceleration. In using the apparatus the values of $g_0$ and $y_{(max)}$ are known before operation is started. The operation chooses a safe value for $g_0$ and $v_{(max)}$ is calculated; thus the $vxg_0$ value is calculated.

Returning to FIG. 3, it will be understood that the deceleration level controller there depicted stands ready to initiate deceleration according to a required schedule during all the time that normal vibration testing is being carried on, but the schedule is not put into operation unless an enabling pulse is received from the deceleration dynamics computer, the jerk input, or the other equivalent devices. This aspect of the functioning is accomplished by the several NAND gates, as 134 to 141. Each of these gates receives two inputs, one from the movable blade of each switch, as blade 145, and the other from a signal source external to FIG. 3; actually from the apparatus of FIG. 4. This is introduced at terminal 149 and is fed to the second imput of each gate by conductor 150. The signal from terminal 149 enables all of the gates and so any sequence dictated by the dynamics of the armature will be passed by the appropriate NAND gates 134 through 141.

The outputs from these gates pass individually through a group of conductors, of which conductor 151 is an example, to a second group of NAND gates 152 through 159. These gates are similarly enabled by a signal received at terminal 161, which is conveyed to all of the gates by conductor 162. This second signal acts to enable all of the gates 152 through 160 to trigger all of the silicon controlled rectifiers for an emergency deceleration. When this second signal is not received, only controlled deceleration is initiated, provided an enabling pulse is received from the deceleration dynamics computer, the jerk input, or an equivalent source.

In logical language the functioning of a typical NAND gate, such as 134 is as follows. The upper input terminal from switch pole 129 is A, from lower enabling conductor 150 it is B, and the output is the function $f$. When either A or B is logical "0," then the output function $f$ is logical "1." When both inputs A and B are logical "1," then the output is logical "0."

It will be recalled that when the signal from the absolute value device 110 is larger than the reference voltage into a differential amplifier, such as 114, the output is logical "0." When the signal is smaller than the reference voltage, the output is logical "1." When terminal B has a logical "0" then the output function $f$ is logical "1" regardless of the logical state of the differential amplifiers, such as 114. The operation of the vibrating system is normal. Should B revert to logical "1," then controlled deceleration ensues.

When the second group of NAND gates, 152 through 160, the input is $f=\overline{AB}$; that is "not AB," at the top terminal, and is another function, say Z, at the lower terminal, from conductor 162. The output function, $f'$, corresponds to $f'=AB/\overline{Z}$. This has the significance of $f'$ being a logical "1" when both A and B are logical "1" or Z being a logical "0." During normal operation of the vibrating system the input Z is logical "1." Should Z revert to a logical "0," then emergency deceleration with the firing of all SCR's ensues, thus shunting all of the resistors available across the armature.

The thus computed matrix of signals is amplified in each case by one of a group of pulse amplifiers 162 through 170. Specifically, the output of NAND gate 152 is connected to the input of pulse amplifier 162, the output of gate 153 is connected to the input of amplifier 163, and so on.

Each amplifier 162 through 170 output is connected to the primary of one pulse transformer, such as 172 through 180, respectively, for usual isolation purposes. Each pulse transformer has a 1:1 turns ratio, with 20 turns of No. 18 AWG wire wound on a type A175.217-2 core. A resistor, such as 181, is connected across the secondary of each transformer 172 through 180, each having a resistance of 910 ohms, to stabilize the operation of the pulse transformer, as is suited to usual practice. The secondary output terminals, as 182 and 183, in each case provide the output from a particular segment of the level computer complex. Each output is conveyed to corresponding inputs on dynamic braking chassis 7, of FIG. 1, typically by means of twisted-pair shielded wires. NAND gate 142 is connected only to conductor 150 and to ground on the input, thereby to provide overtravel actuation. NAND gate 160, amplifier 170 and transformer 180 are connected as has been recited.

A low level velocity detector is also included in FIG. 3. This circuit acts to fire all of the SCR's which shunt the resistors across the armature when the armature is near zero velocity, as deceleration is nearly completed. This circuit also performs a latching function; that is, prevents drift of the armature position after it comes to zero velocity. This occurs because all of the resistors remain connected across the armature and a mechanical movement acts to generate a current by cutting lines of force of the stationary field structure. Since a low impedance closed circuit exists through the resistors, work is required to move the armature and so it stays at rest.

The low level velocity detector is comprised of an absolute value device 108 and a differential amplifier 109. This absolute value device is similar to previously described absolute value device 110 of FIG. 3, and the circuit of the differential amplifier is the same as that of 114. This circuit is detailed in FIG. 6.

Considering first the absolute value device 108 detailed in FIG. 3, resistor 554, typically of 20,000 ohms resistance, connects to incoming conductor 27. The second terminal of resistor 554 connects to Zener diodes 555 and 556, which may be of the RS6 type. These diodes are connected in series "back to back," and thence to ground, to limit the amplitude of the input signal into amplifier 558 to ±6 volts peak amplitude. This limited amplitude is first impressed upon potentiometer 557, of 20,000 ohms maximum resistance, by a connection from the anode of diode 555 through the potentiometer and to ground.

The variable tap on potentiometer 557 connects to the + input of operational amplifier 558, which may be known Zeltex 115 B type. The negative input terminal is connected through resistor 559, of 10,000 ohms resistance, to ground, and also through resistor 560, of 5,100 ohms, to the cathode of diode 561, which may be of the 1N270 type. The anode of diode 561 is connected to the cathode of a similar diode 562 and to the output connection of amplifier 558. The anode of diode 562 connects to one terminal of adjustable resistor 563, of 20,000 ohms maximum resistance and therethrough to the negative input of amplifier 558. The combination of diodes 561 and 562, with resistors 557, 560 and 563 and amplifier 558 forms a precision half-wave rectifier. Trim resistor 564, of 33,000 ohms, is connected from the positive terminal of battery 570 to amplifier 558.

Amplifier 565 may be the known Philbrick type PP65AU. The positive input terminal thereof connects to the anode of diode 562 through resistor 566, of 10,000 ohms, and the negative input terminal of this amplifier connects to the cathode of diode 561 through resistor 567, also of 10,000 ohms. The output of amplifier 565 connects to the negative input through resistor 568, of 10,000 ohms, and capacitor 569, of 20 pf. capacitance in parallel; thus providing feedback of negative sign for amplifier 565. Resistor 571, of 33,000 ohms, connects amplifier 565 to the positive terminal of battery 570, as before. The negative terminal of this battery is grounded. Resistor 572, of 10,000 ohms, connects the + input terminal of amplifier 565 to ground. Both amplifiers 558 and 565 have other direct connections to ground.

In the operation of absolute value device 108, potentiometer 563 is adjusted until equal amplitudes of the rectified signal (waveform 112) are secured at the output of amplifier 565.

The output from absolute value device 108 passes through resistor 575, of 220 ohms resistance, and to the signal input of differential amplifier 109; the latter being the equivalent of differential amplifier 114, as has been explained. In amplifier 109 the bias resistors for the reference input are 577, of 5,100 ohms, and 578, of 220,000 ohms. These resistors are connected in series and in series with battery 579, typically of 12 volts. The reference voltage input is thus slightly less than −12 volts. The output signal from differential amplifier 109 passes via conductor 189 to one input of NAND gate 185, for the actuation thereof.

In the operation of the whole low level velocity detector, the signal level at which it will actuate is determined by the adjustment of potentiometer 557. When the incoming signal exceeds this preset level the output of differential amplifier 109 is logical "0." When the signal is less than this value the output is logical "1." Normally, potentiometer 557 is adjusted to cause the low level velocity detector to switch logic levels when the velocity signal input falls below plus or minus 1 volt, but this can be adjusted to detect any velocity signal voltage from 1 to 5 volts peak.

The NAND gate 185 and another one 186, with pulse amplifier 187, pulse transformer 188 and a resistor the equivalent of resistor 181, are provided to convey the output of the low level velocity detector to succeeding apparatus, and to perform the latching function at the dynamic braking chasis. The connections of these elements are the same as the connections of prior elements, as 134, 152, 162, 172 and 181. The lower connection to NAND gate 185 from conductor 150 and the lower connection to NAND gate 186 from conductor 162 are the same as has been provided for the main sequences of NAND gates previously described.

NAND gates 142 and 160, with pulse amplifier 170 and a resistor the equivalent of resistor 181 are provided to supply a pulse to the dynamic braking chasis 7 of FIG. 1, whenever the overtravel switch on the shaker is opened. This signal is carried by conductor 162 in FIG. 3.

FIG. 4 includes that part of deceleration level controller 6 which processes the trigger (actuating) signal from the deceleration dynamics computer of FIG. 2, and from other similar inputs to the controlled deceleration system so that the circuitry of FIG. 3 is made effective to accomplish controlled deceleration.

The jerk input signal from that entity shown in FIG. 1 is provided as an input to this part of the deceleration level controller via terminal 191. This terminal connects to the input of differentiator and level detector 192. After differentiation the resulting voltage waveshape then enters a pair of Schmidt triggers, oppositely biased, which act as the level detector part of this entity. An OR gate provides the output. The circuit details are given in FIG. 10.

In order to provide pulses of uniform amplitude, shape and duration, and for isolation of inputs, a trio of pulse shapers 193, 194 and 195 are provided. Shaper 193 is connected to the output of device 192. The shapers are one-shot multivibrators and these are detailed in FIG. 11.

The output of automatic acceleration limiter 15 of FIG. 1 connects to terminal 196 in FIG. 4, which terminal in turn connects to pulse shaper 194. Similarly, the output of deceleration dynamics computer 3 of FIG. 1, being conductor 106 of FIG. 2, connects to terminal 197, which in turn connects to pulse shaper 195. The dotted ring and ground around the conductors of this part of FIG. 4 signifies a coaxial shielded conductor, as 107 in FIG. 2.

It is important that the deceleration system be actuated in case of a failure of primary alternating current power. Terminals 198 and 199 connect to such a source of power and provide an input to A.C. power failure detector 200. This device employs a Schmitt trigger and is detailed in FIG. 13.

The outputs of each of these enabling devices are connected to the four inputs of NAND gate 201; the first three from the outputs of pulse shapers 193–195 and the last directly from the output of device 200. The NAND gate is the same as is detailed in FIG. 7, save that there are four diode inputs instead of two diode inputs shown in FIG. 7. In accordance with the functioning of the NAND gate, any one of the inputs thereto will be passed on through to the output. Thus, any one of the devices may actuate flip-flop 202, the input of which is connected to the output of the NAND gate.

Flip-flop 202 acts as a memory, in that it stays "flipped" once an actuating pulse has been transiently delivered to its input. This serves to maintain the deceleration system in the decelerate mode until the whole is reset. Reset is accomplished by depressing momentary type switch 203 to the lower position, thereby to connect battery 204 through certain elements to be later described, and also through resistor 205, of 1,500 ohms, to flip-flop 202 and return via a common (ground) connection.

Normally, a logical "0" output is provided at conductor 206 from the flip-flop. That is, the "0" is provided when deceleration is not occurring and normal use of the vibrating systems to vibrate specimens is taking place. When deceleration is initiated, this output turns to a logical "1." This value is power-amplified by amplifier 207, which is detailed in FIG. 9. The phase is not reversed and is delivered to terminal 208 as a voltage level of −12 volts. Terminal 208 of FIG. 4 directly connects to terminal 149 of FIG. 3, thus providing the enabling input to NAND gates 134 through 142 and 185. Because of this multiple load pulse amplifier 207 is required to have the capability of driving, say 32, gates of the type shown in FIG. 7. This is easily accomplished in the art.

Overtravel detector and disconnect signal generator 209 is energized by an input from terminal 210. An overtravel switch located upon shaker 1 is connected to terminal 210. This switch is mechanically opened upon an extreme excursion being taken by the armature, slightly beyond which mechanical stops to armature overtravel are located. When this degree of excursion occurs, for some very unusual reason, the present deceleration system fires all SCR's and shunts all resistors in parallel across the armature winding, thereby to bring the armature to a sudden stop to prevent physical damage thereto. This device 209 is detailed in FIG. 12.

The overtravel detector includes an inverter, which is in the logical "1" state when the overtravel switch is closed and is logical "0" otherwise. The output therefrom is obtained at conductor 211. This output is power amplified by amplifier 212 and is available as an output at terminal 214. This terminal connects directly to terminal 161 of FIG. 3 and from there to the enabling multiple connection 162 to NAND gates 152 through 160 and 186. As before, normal operation engenders a logical "1" and deceleration a logical "0."

The disconnect signal generator is essentially a NAND gate, having an input from the output of the overtravel detector and via conductor 215 from flip-flop 202. An output from this gate passes through conductor 216 to amplifier 217. This amplifier is the same as those in the group 162 through 170 and 187 of FIG. 3. The output from this amplifier passes through pulse transformer 218, which is the same as transformers 172 through 180 and 188. A resistor, as 181, is also connected across the secondary of transformer 218. The output is a disconnect signal and is conveyed to the electronic disconnect switch 16 via conductor 17 in FIG. 1.

From the disconnect signal output, conductor 211, there is internally a connection to a lamp driver circuit, which connects to reset switch 203 via conductor 219. This causes indicating lamp 220 to be illuminated by current flowing through the two upper contacts, normally closed, of switch 203, and through resistor 221, of 300 ohms, in series with lamp 220. The lamp is illuminated when emergency or controlled deceleration has taken place.

Relay 222 is provided to remove the coil of relay 223 from the 115 volt A.C. power upon the cessation of current through contacts 225 of relay 222. During normal operation of the vibration system current is caused to flow through the coil of relay 222 by a circuit from ground through battery 204, current-limiting resistor 224, of 1,000 ohms, the current-limiting resistor 221, through lamp 220 and to +12 volts of battery 190, returning to ground.

When the current through the coil of relay 222 is interrupted, contact is broken between the arm of this relay and its contact 225, which de-energizes the coil of relay 223 therethrough and return conductor which connects to terminal 199. This swings the arm of relay 223 from one external connection 226 to another external connection 227. The arm connects to external connection 228. These connections are part of an interlock system that supplies 115 volts A.C. power to power amplifier 10 of FIG. 1.

A fuse 230 is interposed in the conductor connecting from terminal 418 of power transformer 420 to contact 225 for usual protection purposes in A.C. power circuits. The secondary terminals of transformer 420 are 418 and 419, while the center-tap grounded primary is connected to A.C. input terminals 198 and 199. As long as terminals 418 and 419 are energized and fuse 230 is not blown, lamp 231 will be illuminated, signifying that this portion of the circuit is active. It will be understood that a certain number of indicator lamps are highly useful in a system of the nature of this controlled deceleration system so that the operator will be informed as to key functioning thereof.

FIG. 5 is a schematic diagram of the absolute value device 110 of FIG. 3. The active elements thereof are essentially two operational amplifiers 235 and 236, each of which may be the Zeltex type 115B, a known commercially-available amplifier.

The input to the device is introduced via conductor 27, as in FIG. 3, this being an alternating current arising from deceleration dynamics computer 3 of FIG. 1. Resistor 237 is in series with this input conductor and typically has a resistance of 2,000 ohms. Potentiometer 238, of 0-2,000 ohms resistance, connects from the second terminal of resistor 237 to ground and provides means for adjusting the amplitude of input to the absolute value device. The variable tap on potentiometer 238 connects to the rest of the circuit; namely, to resistor 239, which connects to the signal input to operational amplifier 235. The variable tap also connects to variable resistor 240, which connects to the signal input to operational amplifier 236 through fixed resistor 241. These resistors may have the following resistance values; resistor 239, 20,000 ohms; resistor 240, 0 to 5,000 ohms; resistor 241, 18,000 ohms.

The second input of amplifier 235 is connected to ground through resistor 242, of 10,000 ohms resistance, and amplifier 236 is connected to ground through resistor 243, of 7,500 ohms resistance. A compound feedback circuit is provided for amplifier 235; resistor 244, of 20,000 ohms, and resistor 245, of 20,000 ohms, have a first terminal connected to the signal input of that amplifier. The second terminal of resistor 245 connects to the anode of diode 246, the cathode of which connects to the output of amplifier 235 to complete the feedback loop. Also connected to the output of amplifier 235 is the anode of diode 247, the cathode of which is connected to the second terminal of resistor 244. The combination of diodes 246 and 247, with resistors 239, 244 and 245, and with amplifier 235, forms a precision half-wave rectifier.

The corresponding feedback element for amplifier 236 is simply capacitor 249, having the small capacitance of 33 pf., and accomplishing high frequency stability.

Amplifiers 235 and 236 are grounded to conductor 250. Each is supplied with a positive source of voltage to operate the transistors thereof from battery 251 by the conductors shown, and similarly with negative voltage from battery 252. These batteries may be replaced by regulated power supplies, of course, as is true throughout this system as reduced to practice. In addition, a connection from battery 251 through variable resistor 253 to amplifier 235 and through variable resistor 254 to amplifier 236 provides an offset adjustment for both amplifiers; that is, to bring the output of the amplifiers to zero volts for the resting condition.

An emitter-follower transistor stage, which includes NPN transistor 255, has the base thereof connected to the output of amplifier 236 through resistor 256, of 1,000 ohms. The collector of the transistor is connected directly to positive voltage battery 251. The emitter is connected to output resistor 257, of 1,500 ohms resistance, and therefrom to negative voltage battery 252. Resistor 258, of 20,000 ohms resistance, is connected as an overall feedback resistor, from the emitter of transistor 255 to the input of amplifier 236. The desired output, consisting of successive half-waves of alternating current, without filtering, appears at terminal 259.

FIG. 6 is the schematic diagram of any one of the voltage comparators identified as "Diff. Amp." 114 through 118 in FIG. 3. Terminal 261, at the right in FIG. 6, receives the input which has signal 112 in FIG. 3. The input circuit is completed to ground through resistor 262, of 22,000 ohms, and is impressed upon the base of transistor 263. The emitter of transistor 263 is connected to the emitter of transistor 264 and these are both connected to resistor 265, of 8,200 ohms, the second terminal of which is connected to a source of positive voltage, say of 12 volts, battery 266. Both transistors may be of the PNP type. The collector of transistor 263 is connected to resistor 267, of 820 ohms, while the collector of transistor 264 is connected to resistor 268, of 2,200 ohms. The second terminals of these resistors are connected together and to the cathode of diode 269, which, in turn, is connected to diode 270, in the same polarity of cathode to anode. The base of transistor 264 is returned to ground through resistor 271, of 22,000 ohms resistance. The collector of transistor 264 is directly connected to the base of transistor 272; this transistor being an NPN type, with the emitter connected to the anode of diode 270, and to ground through resistor 273, of 8,200 ohms. Capacitor 274 shunts resistor 273 and has a capacitance of 1,000 pf. The collector of transistor 272 is connected to output terminal 275, which terminal connects to conductor 128 in FIG. 3. This collector is also connected to the positive terminal of battery 266 through resistor 276, of 39,000 ohms resistance.

Battery 119 and voltage dividing resistors 120 and 125 are reproduced from FIG. 3 in FIG. 6. The common connection between the resistors connects to the base of transistor 264 to supply the reference voltage thereto.

This differential amplifier, of FIG. 6, may be the type DCIMS-DA1 of Control Logic, Inc.

FIG. 7 is the schematic diagram of a typical NAND gate employed in FIG. 3 at elements 134 through 142, 152 through 160, 185 and 186.

The two inputs are connected to terminals 280 and 281, such as conductors A and B, respectively, at gate 134. The anodes of diodes 282 and 283 are connected to these terminals, while the cathodes are connected together and to the cathode of diode 284. The anode of the latter is connected to resistor 285, of 3,000 ohms resistance. The second terminal of resistor 285 is connected to the base of transistor 286, the emitter of which is connected to ground and the collector to resistor 287, of 22,000 ohms resistance. The second terminal of resistor 287 is connected to a negative voltage source, such as battery 288, of 12 volts, the positive terminal thereof being connected to ground. Resistor 289, of 3,000 ohms resistance, also connects to the negative terminal of battery 288 and to the cathodes of the NAND diodes 282 and 283. The base of transistor 286 is given a positive bias by connection of the positive terminal of source 290 through resistor 291, of 22,000 ohms.

The NAND gate of FIG. 7 may be the type DCIMS-NG2, of Control Logic, Inc. NAND gate 201 of FIG. 4 is the same as that of FIG. 7, but with four input terminals 280, etc. and four input diodes 282, etc.

FIG. 8 is the schematic diagram of a typical pulse amplifier employed in FIG. 3 as elements 162 through 170 and 187, and in FIG. 4 at 217.

Terminal 295 is illustrative of the single signal-carrying input conductor, such as extending from f' in FIG. 3. The signal passes through capacitor 296, of 1,000 pf. capacitance, to the base of PNP transistor 297, which may be of the 2N2638 type. A negative bias is placed upon terminal 295 by resistors 298 and 299 in series, with one terminal of resistor 299 connected to ground, the common connection between the two transistors connected to terminal 295 and the other terminal of resistor 298 connected to the negative terminal of voltage source 300, the positive terminal of which is connected to ground. Resistor 298 may have a resistance of 5,100 ohms, resistor 299 a resistance of 100,000 ohms and source 300 a voltage in the range of 12 to 15 volts. The negative bias is used to insure that transistor 297 will turn on when signal f' of FIG. 3 changes from logical "0" to logical "1." This is insured by thus supplying sufficient base current to transistor 297.

The base of transistor 297 is given a positive bias from battery source 301 through resistor 302, of 10,000 ohms resistance. The anode of diode 303 is connected to plus source 301 and the cathode of the diode is connected to the emitter of transistor 297. The positive terminal of source 301 is also connected to resistor 304, of 33,000 ohms, and therethrough to terminal 305 and to capacitor 306, of 5 microfarads capacitance, the second terminal of this capacitor being grounded.

The collector of transistor 297 is connected through resistor 307, of 1,000 ohms, to the trigger (control) electrode of silicon controlled rectifier 308. SCR 308 is a low power device, such as a Motorola MCR 214-2. The cathode thereof is connected to ground through resistor 309, of 1 ohm resistance. The control electrode of the SCR is also connected to ground through resistor 310, of 5,000 ohms.

The anode of SCR 308 is connected to terminal 311. Between the two terminals 305 and 311 the perimary of a pulse transformer, such as 172 in FIG. 3, is connected in each application in that figure.

In operation, transistor 297 is normally "off"; that is, not conducting current. Upon logical "1" appearing at terminals 295 (and ground), as a pulse of −12 volts, the resistor is turned "on," SCR 308 is turned on, and capacitor 306 is discharged through the primary of pulse transformer 172 and SCR 308. This gives the pulse output sought, which at terminals 182 and 183 in FIG. 3 is a positive pulse of approximately 10 volts amplitude and 10 microseconds duration.

FIG. 9 is the schematic diagram of the pulse "power" amplifiers 207 and 212 of FIG. 4. The signal input in each case, from conductor 206 or 211, is connected to input terminal 314. As with the NAND gate of FIG. 7, there follows a series diode, 315, with the anode thereof connected to terminal 314. Further in series, diode 316 is connected with its cathode connected to the cathode of diode 315, next is resistor 317, of 3,000 ohms resistance and connected to the anode of diode 316, and next is the base of PNP transistor 318. The common connection between the cathodes of diodes 315 and 316 is given a negative potential through resistor 319, of 3,000 ohms resistance, from battery voltage source 320, having a voltage of 12 volts negative, with respect to ground. The collector of transistor 318 is connected to the negative terminal of source 320 through resistor 321, of 825 ohms resistance. The base of transistor 318 is additionally connected to a battery voltage source 322, having a positive 12 volts potential with respect to ground, through resistor 323, of 22,000 ohms resistance. Also connected to positive source 322 are resistors 324 and 325 in series to the collector of transistor 318. These resistors have resistances of 22,000 and 820 ohms, respectively. Capacitor 326, of 1,000 pf. capacitance, shunts resistor 325. The base of transistor 327 connects to the common connection between resistors 324 and 325, being also connected to the collector of transistor 318 through resistor 325 and thereby receiving the pulse signal for amplification and phase reversal. The emitter of transistor 327 is connected directly to ground and the collector to a negative voltage at source 320 through resistor 328, of 22,000 ohms resistance. Output terminal 329 connects to the collector of transistor 327, and as employed in FIG. 4 connects to terminals 208 or 214, as the case may be. Both transistors are of the PNP type.

This power amplifier may be the type DCIMS-PA1 of Control Logic, Inc.

FIG. 10 is the schematic diagram of the differentiator and level detector 192 of FIG. 4. Terminal 191 of that figure has the same designation in FIG. 10.

The differentiator is centered around operational amplifier 331 in FIG. 10. This amplifier may be a Zeltex 115B. Terminal 191 is connected to differentiating capacitor 333, of 1,000 pf. capacitance, and roll-off resistor 334, of 1,200 ohms resistance. The second terminal of resistor 334 is connected to the negative signal input of amplifier 331. The positive signal input is connected to ground through resistor 336, of 7,500 ohms resistance. Differentiating resistor 337, of 7,500 ohms, connects from input to output of amplifier 331 and roll-off capacitor 338, of 120 pf., is shunted across resistor 337. Out of the differentiator section just described there is delivered an alternating current waveform.

This is impressed upon branching conductor 339, thereby to pass into two Schmitt triggers, oppositely biased, and adjusted to fire at minus 5 and plus 5 volts, respectively. Balance and adjustment for the same are provided by variable resistors 340 and 340', respectively, each having a maximum resistance of 10,000 ohms and each connected to conductor 339.

Continuing with the upper Schmitt trigger, resistor 342 has a resistance of 15,000 ohms and is connected in series between resistor 340 and the base of PNP transistor 343, of the 2N3638 type. The collector of transistor 343 is connected to ground through resistor 344, of 1,500 ohms resistance. The base of transistor 343 is further connected through resistor 345, of 10,000 ohms, to a positive voltage source, as battery 346, 12 volts positive with respect to its ground connection. Diode 347 is of the Zener type, and is connected between the positive terminal of source 346 and the emitter of transistor 343. The voltage at which this Zener diode maintains between the points to which it is connected is 5.1 volts, it being of the 1N751 type. This gives the reference voltage for setting the triggering level for the Schmitt trigger. The collector of transistor 343 is connected to the base of transistor 348, also of the PNP 2N3638 type, through resistor 349, of 10,000 ohms resistance. A positive bias is placed upon this base by resistor 350, of 33,000 ohms, being connected thereto and to the positive terminal of voltage source 346. The collector of transistor 348 is connected to ground through resistor 351, of 1,500 ohms.

The lower part of this portion of FIG. 10 may be considered a "mirror image" of what has just been described. The resistance of each resistor with a primed identifying numeral is the same as that of the non-primed numeral and the circuit connections are the same in each case. Transistors 343' and 348' are, however, of the NPN type, as the 2N3646. Also, battery voltage source 346' supplies a negative voltage with respect to ground and Zener diode 347' is connected with anode to the negative voltage source; both to accommodate the reverse polarity of the NPN transistors.

Output is taken from the Schmitt trigger having transistor 348' and is passed through a saturating inverting pulse amplifier characterized by transistor 353, of NPN type 2N3646. Connection is made via resistor 354, of 18,000 ohms, from the collector of transistor 348' to the base of transistor 353. Bias to the base is provided through resistor 355, of 33,000 ohms, which is connected between the base and the positive terminal of battery 346. Resistor 356 is similarly connected to the collector of transistor 353 and has a resistance of 3,300 ohms. The emitter of transistor 353 is connected directly to ground and the collector thereof is returned to ground through resistor 357, of 3,300 ohms.

An output pulse is obtained from the collector of Schmitt trigger transistor 348, which extends from plus zero volts to plus 6 volts, and similarly from the collector of transistor 348' in the negative range from minus 6 to zero volts. Upon phase reversal by transistor 353 an output extending from plus 6 volts to zero volts is impressed upon the cathode of diode 358, while the same polarity pulse is impressed direcly upon cathode of diode 359 from the collector of transistor 348. These two diodes form the first part of the OR gate having NPN 2N3646 transistor 360. In that gate the anodes of both diodes are connected together and to the base of transistor 360. The base is connected to the positive terminal of source 346 through resistor 361, of 43,000 ohms resistance, while the collector thereof is similarly connected through resistor 362, of 10,000 ohms. The emitter is connected to ground through diode 363, which may be of the 1N914 type. Output terminal 364 is connected to the collector of transistor 360. Thereat a pulse extending from a datum of zero volts to plus 12 volts is supplied according to the logical function A+B; where A is the output from the upper Schmitt trigger and B is the output from the inverter, with logical "0" being zero volts and logical "1" being plus 6 volts or greater.

It will be noted in FIG. 4 that this output is conveyed to pulse shaper 193. This is for the purpose of providing a uniform pulse format to NAND gate 201 and for isolation of three pulse inputs thereto with respect to preceding apparatus.

FIG. 11 is a schematic diagram of a typical pulse shaper, such as employed at 193, 194 or 195 in FIG. 4. These are each one-shot transistorized multivibrators.

Input terminal 366 connects to series resistor 367, of 3,900 ohms resistance. From the second terminal thereof capacitor 368, of 1,000 pf., is connected to the anode of diode 369, which may be of the 1N914 type. The cathode thereof is connected to the base of transistor 370, of the PNP type. The input circuit is connected to ground through resistor 371, of 3,900 ohms, which is connected to the common connection between resistor 367 and capacitor 368. A negative bias is placed upon the anode of diode 369 by resistors 372 and 373, which are connected in series between negative voltage source, battery 374, and ground. These resistors have resistances of 100,000 and 3,900 ohms, respectively, and the anode of diode 369 is connected to the common connection between them. The emitter of transistor 370 is connected directly to ground and the collector is connected to negative voltage source 374, of 12 volts, through resistor 375, of 3,900 ohms resistance.

Transistor 370 is cross-connected to a companion transistor 376, the emitter of which is also connected directly to ground and the collector to source 374 through resistor 377, of 3,900 ohms. The base of transistor 376 is connected to the collector of transistor 370 through resistor 378, of 3,900 ohms resistance, and also to a positive voltage source 379, typically of 12 volts, through resistor 380, of 22,000 ohms resistance. The base of transistor 370 is connected to negative voltage source 374 through resistor 381, of 8,200 ohms resistance. Capacitor 382, of 10,000 pf. capacitance, is also connected to the base of transistor 370 and to output terminal 383, which terminal is also connected to ground through resistor 384, of 3,900 ohms resistance.

As used, these pulse shapers accept a positive pulse having an amplitude in the range of from 12 to 24 volts and supply a pulse of uniform shape extending from a datum of minus 12 volts to zero volts, with a duration of the order of 50 microseconds and a somewhat gradual return to the minus 12 volt datum.

FIG. 12 is a schematic diagram of overtravel detector and disconnect signal generator 209, as employed in FIG. 4.

The first input to this device has to do with the overtravel detector and originates at normally closed switch 387. This is mounted on shaker 1 in FIG. 1 such that it is mechanically opened by overtravel of the armature of the shaker. One contact of this shown switch is connected to ground and the other to the cathode of diode 388. This cathode is also connected to a negative voltage source, 389, having a voltage of 12 volts, through resistor 390, of 3,300 ohms resistance. When switch 387 opens due to overtravel, a negative voltage is impressed upon the cathode of diode 388, which may be of the 1N914 type.

The anode of this diode is connected to the base of transistor 391, of PNP 2N404 type, through resistor 392, of 3,900 ohms resistance. Diode 388 and resistor 392 comprise a threshold circuit to prevent false triggering of the rest of the circuit. The base of transistor 391 is also connected to positive voltage source 393, of 12 volts, through resistor 394, of 22,000 ohms resistance, to provide a positive bias thereon. This transistor is essentially a phase inverter. The emitter is connected to ground and the collector thereof is connected to minus voltage source 389 through resistor 395, of 22,000 ohms. The collector is also connected to output terminal 396, which connects to output conductor 211 in FIG. 4.

Transistor 397 and associated elements comprise a NAND gate. One input thereto is taken from output terminal 396 and passes to the anode of diode 398. The cathode thereof connects to the cathode of diode 399 and also to negative voltage source 389 through resistor 400, of 3,900 ohms resistance. The second input to the NAND gate is received via input terminal 401, coming from flip-flop 202 in FIG. 4, via conductor 215. This input is impressed upon the anode of diode 402, the cathode of which is also connected to the cathode of diode 399. The anode of diode 399 is connected to the base of transistor 397 through resistor 403, of 3,900 ohms resistance. The base is also connected to the positive voltage of source 393 through resistor 404, of 22,000 ohms. The collector of transistor 397 is connected to negative voltage source 389 through resistor 405, of 3,900 ohms resistance, and also to output terminal 406, which terminal connects to output conductor 216 in FIG. 4.

The collector of transistor 397 is also connected to the remaining part of the circuit, a lamp driver, through resistor 407, of 3,900 ohms. The second terminal of this resistance connects to the base of transistor 408, of PNP 2N3638 type, which base also connects to positive voltage source 393 through resistor 409, of 20,000 ohms. The emitter of transistor 408 connects directly to ground and the collector connects to the trigger (control) electrode of SCR 410 through resistor 411, of 5,100 ohms resistance. The cathode of SCR 410 is connected directly to negative voltage source 389 and the control electrode also thereto through resistor 412, of 1,000 ohms resistance. The main anode terminal of the SCR is connected to output terminal 414. The auxiliary anode terminal is connected to positive voltage source 393 through resistor 415, of 6,800 ohms. SCR 410 may be of the low current type 3N84. Terminal 414 connects to conductor 219 in FIG. 4.

In the lamp driver, transistor 408 receives and amplifies an actuating signal from the NAND gate transistor 397, when appropriate. This triggers SCR 410, which remains conducting and lights lamp 220 in FIG. 4 until the anode circuit of the SCR is broken by switch 203.

FIG. 13 is a schematic diagram of alternating current power failure detector 200, as employed in FIG. 4. A transformer 417 is preferably employed for the input and is typically located in the main power supply for all of the apparatus of FIG. 1. Primary terminals 415 and 416 connect to the main alternating current power source in that power supply, so that when there is no power at these terminals there is no power at any of the terminals operating the rest of the equipment. The primary of transformer 417 may be suited to connect to a 115 volt circuit, a 240 volt circuit, or as required to connect to the main power source. The secondary connects to terminals 198 and 199 in FIG. 4 and may have a voltage of 36 volts with a center tap to ground, thereby forming a full-wave rectifier in combination with diodes 421 and 422. These may be of the TI56 type and the cathodes thereof connect together in FIG. 13 at junction point A. At this point there exists a waveform composed of successive, adjacent half-cycles of essentially sinusoidal waveshape. Fixed resistor 423 and adjustable resistor 424 are connected in series between junction point A and capacitor 425, the second terminal of which is connected to ground. These elements comprise an RC filter having an adjustable time constant, and may have the values; 7,500 ohms, 20,000 ohms maximum, and 5 microfarads, respectively.

At point B there exists a waveform that is essentially an unvarying potential plus a ripple voltage corresponding to the successive half-cycles at point A. This ripple may be made larger by reducing the resistance of adjustable resistor 424 and vice versa. The adjustment is set in practice to fire the Schmitt trigger, which comprises the further part of FIG. 13, at, say, 87% of the normal voltage of the power source.

From point B, resistor 426, of 12,000 ohms resistance, is connected to the base of transistor 427. This is the first transistor of the Schmitt trigger, and may be of the NPN 2N3646 type. The base is provided with a negative bias from voltage source 428, through resistor 429, of 10,000 ohms. Battery source may have a voltage 12 volts negative with respect to ground. The collector of transistor 427 is connected to ground through resistor 430, of 1,500 ohms resistance, and is also conected to the negative terminal of battery 428 through resistors 431 and 432 in series, of 10,000 and 33,000 ohms, respectively.

The signal from the collector of transistor 427 is conveyed through resistor 431 to the base of transistor 433. The collectors of either of transistors 427 and 433 are maintained at a fixed voltage, of say 7 volts, when turned on, by Zener diode 434; which may be of the 1N751 type and has its anode connected to the negative terminal of battery 428 and its cathode to the emitters of the transistors.

The collector of transistor 433 is connected to ground through resistor 435, of 1,500 ohms resistance, and is also connected to the positive terminal of voltage source 436 through resistors 437 and 438 connected in series. These resistors may have a resistance of 3,900 ohms and 22,000 ohms, respectively. The base of an output transistor 439, which maye be of the PNP 2N3638 type, is connected to a common connection between resistors 437 and 438, thereby receiving the signal produced by the Schmitt trigger. The emitter of transistor 439 is connected to ground and the collector is connected to negative voltage source 428 through resistor 440, of 22,000 ohms resistance. The collector is also connected to output terminal 441, which provides the lower input to NAND gate 201 in FIG. 4.

When the alternating current power supply voltage reduces from its normal value, as has been mentioned, the Schmitt trigger detects this reduction and the same appears at the output terminal 441, having, for example, an amplitude of zero volts from a datum of minus 12 volts. It remains thus until the line voltage returns to normal.

FIG. 14 is a schematic diagram of flip-flop memory 202, as employed in FIG. 4. Terminal 444 in FIG. 14 connects to NAND gate 201 in FIG. 4. The cathode of diode 445, which may be of the 1N914 type in common with all diodes in FIG. 14, is connected to terminal 444 and the anode is connected to the base of first transistor 446 through resistor 447, of 2,200 ohms resistance. The emitter of first transistor 446 and of second transistor 447, both of which may be of the PNP 2N404 type, are both connected to ground. The base of transistor 446 is also connected to the cathode of diode 448, the anode of which is connected to capacitor 449, which in turn is connected to resistor 450, of 5,600 ohms, and thence to ground. Capacitor 449 may have a capacitance of 1,000 pf. The base of transistor 447 is similarly connected, through diode 451, capacitor 452 and resistor 453.

The bases of the transistors are also cross-connected to provide flip-flop operation. The base of transistor 446 is connected to the collector of transistor 447 through resistor 454, of 3,900 ohms, and thence to output terminal 455. Similarly, the base of transistor 447 is connected to the collector of transistor 446 through resistor 456, of 3,900 ohms, and to output terminal 457. The base of transistor 445 is given a positive bias from positive voltage source 458 through resistor 459, of 22,000 ohms resistance, while the same occurs for the base of transistor 447 through resistor 460, of the same resistance. The collector of transistor 446 is connected to negative voltage source 461 through resistor 462, of 2,200 ohms resistance, while the same connection is made to the collector of transistor 447 through resistor 463, of the same resistance. The base of transistor 447 is connected to ground through resistor 464, of 2,200 ohms resistance, and through the anode to cathode polarity of diode 465. Output terminal 455 is clamped by diode 466, with the anode thereof connected thereto and the cathode to the anode of diode 451. Similar clamping is provided for output terminal 457 by similarly connected diode 467.

An additional terminal 468 is connected to the anode of diode 469, the cathode of which connects to the common connection between capacitor 449 and resistor 450, and thence through resistor 443, of 5,600 ohms, to the negative terminal of voltage source 461. Still further, this resistor is connected to resistor 470, of 5,600 ohms, the second terminal of which resistor is connected to the common connection between capacitor 452 and resistor 453. Resistor 471, of 22,000 ohms resistance, connects from the negative terminal of voltage source 461 to the cathode of diode 467, and similar resistor 472 similarly connects to the cathode of diode 466.

The terminals of the flip-flop of FIG. 14 connect to the associated devices in FIG. 4 in the following manner. The input terminal to the flip-flop is terminal 444 and this connects to the output of NAND gate 201. Output terminal 455 connects to conductor 206 in FIG. 4, and output terminal 457 connects to conductor 215. Terminal 468 connects to resistor 205 in FIG. 4, and thence to reset switch 203, as has been generally described previously. It may be additionally said that when the vibration system is in useful operation, relay 222 is energized and the current to accomplish this is small, of the order of 9 milliamperes. Although lamp 220 is connected in the same circuit, it does not illuminate because the current required to so do is relatively large, of the order of 40 milliamperes. Relay 222 being energized also energizes relay 223, giving a closed circuit between terminals 227 and 228. These terminals connect to the interlock circuit which powers the power amplifier 10 of the vibration system, allowing it to be in normal operation.

When controlled deceleration is initiated according to the system of this invention, SCR 410 of FIG. 12 shorts conductor 219 to a source of minus 12 volts. This de-energizes relay 222 and illuminates lamp 220, since now battery 213 and battery 389 (FIG. 12) are in series. At the same time relay 223 is deenergized and the interlock circuit to the power amplifier is opened. This removes the power from the power amplifier, as is desired. It will be understood that elements of armature protector 18 (FIG. 1) also go into play to quickly deactivate the power amplifier, but it will be seen that the primary source of power to the same must be removed in order that the deactivation be expedited and made permanent. That is, the deactivation is permanent until switch 203 is depressed. This resets flip-flop 202 and otherwise returns device 209, the relays, etc. to the condition which allows normal operation of the vibration system.

FIG. 15 is a schematic diagram of electronic disconnect switch 16 of FIG. 1. It will be recalled that this entity is connected between the output of the power amplifier and the dynamic braking chassis so that the power amplifier can be disconnected from the shaker armature when deceleration is to be accomplished. Accordingly, transformer 475 in FIG. 15 is the large power output transformer of the power amplifier, frequently constructed to handle 50 to 100 kilowatts of alternating electrical energy for vibration purposes and frequently housed in the power amplifier cubicle 10 (FIG. 1). The primary thereof connects to the plates of the vacuum tubes or the collectors of power transistors. These are frequently connected in push-pull or push-pull parallel, as is known in the art. Herein, the characteristically low impedance secondary connects to ground and to one terminal of a diode bridge for accomplishing the electronic disconnect function, rather than directly to the armature of the shaker 1 of FIG. 1 as in the prior art.

The power diodes of the bridge are identified in pairs that are arranged in series. This is to provide an adequate breakdown voltage at desired current rating in utilizing commercially available diodes. These are elements 476, 477, 478 and 479, each individual diode which may be the MR1239SL type for a typical power embodiment, there being a total of eight units. Should the voltage requirement of the embodiment be less, only one unit may be used in each position, a total of four units.

The anodes of diodes 476 are connected toward the ungrounded terminal of the secondary of transformer 475, while the cathodes of diodes 478 are similarly connected. Power is allowed to flow through the electronic switch when SCR's 480 and 481 are conducting and not to flow when they are not conducting. These SCR's are connected across the central diode bridge diagonal. Two SCR's are employed in the embodiment illustrated to carry the current involved, say 175 amperes, while still being of the air-cooled type, such as the C181S. For half the current only one would be required.

The anode of SCR 480 is connected to resistor 482, of 0.03 ohms resistance, and the anode of SCR 481 is connected to resistor 483, of the same resistance, so that the current shall be carried approximately equally between the two paths. The second terminal of resistor 482 is connected to inductor 585 and the second terminal of resistor 483 is connected to inductor 586. The second terminal of each of these inductors is connected to the cathode of second diode of 476 in that seriesed pair. Each inductor has an inductance of the order of 100 microhenries. The purpose of the inductors is to allow the current flowing from capacitors 550 and 551 (to be later described), when further SCR's 525 and 526 become conducting (also to be later described), to flow initially into SCR's 480 and 481. Some current will also flow into resistors 482 and 483, and diodes 476 and 477, but the purpose of the inductors is to delay this current. The bridge is shunted by capacitor 505, of 25 microfarads.

The cathode of the first of the seriesed pair 477 is also connected to the second terminal of inductors 585 and 586, while the anode of the second diode 477 is connected to output terminal 484. The bridge is completed by the first diode cathode of pair 478 connecting to the ungrounded terminal of the secondary of transformer 475, the anode of the second diode of pair 478 connecting to the cathode power lead of both SCR's 480 and 481, while these are also connected to the anode of the first diode in pair 479, and the cathode of the second diode of pair 479 also connects to output terminal 484. Output terminal 485 is connected to ground.

These output terminals connect to input terminals on the dynamic braking chassis 7 and from the output thereof to the armature winding of shaker 1. Other input and output terminals in FIG. 15 have to do with matters of deceleration control.

The low current external lead provided on SCR 480 from its cathode is connected to one terminal of resistor 486, of 22 ohms resistance, and also to the anode of diode 487, of the 1N2071 type. The second terminal of resistor 486 connects to the control electrode of SCR 480 and the cathode of diode 487 connects to ground. Resistor 488 and diode 489 are symmetrically connected to SCR 481 in the same manner as has just been recited. The control electrode of SCR 480 is also connected to the cathode of diode 490, of 1N2071 type, the anode of which connects to "disconnect on" indicating lamp 491. Diode 492 is similarly connected with respect to SCR 481. These diodes may each be multiple, in series.

We now turn to the control circuits which determine whether the electronic disconnect switch shall be open or closed.

Terminal 494 receives a 10 volt pulse via conductor 17 from the deceleration level controller 6 in FIG. 1. In greater detail, this is a pulse from pulse transformer 218 in FIG. 4. The second connection from the pulse transformer is connected to input terminal 495.

It will be understood that the objective of opening the electronic disconnect switch of FIG. 15 is accomplished by rendering SCR's 480 and 481 non-conducting. This is accomplished in two ways; by removing the "on" control electrode signal from the control electrons thereof and to cause the conduction previously established between cathode and anode to cease by impressing a negative voltage surge upon the anodes thereof.

The first part of the objective is accomplished by SCR 521 conducting. This is brought about because the pulse that appears at entrant terminals 494 and 495 also appears at the primary pulse transformer 522 by the connections shown. The secondary of this transformer is connected between the cathode and the control electrode of SCR 521. Resistor 523, of 1,000 ohms resistance, is connected across the secondary of pulse transformer 522 for the usual reason of enhancing transformer stability. The cathode of SCR 521 is connected to ground and the anode thereof to positive voltage source 511 through resistor 524, of 20 ohms resistance. When the anode of SCR 521 is shorted to the cathode by electric conduction between the two the current to the control electrodes of SCR's 480 and 491 is reduced to zero from an "on" value of the order of 100 milliamperes, each. This reduction of current enables these SCR's to be turned off.

The second part of the objective is accomplished largely through SCR's 525 and 526. These are not conducting during the useful operation of the vibration system, but by becoming conductive when deceleration is initiated they allow current from capacitors 550 and 551 to flow into SCR's 480 and 481 in a reverse direction with respect to the normal load current flow. In effect, this decreases the anode to cathode current to zero, thereby shutting off SCR's 480 and 481.

Inductors 587 and 588, each of 3 microhenries inductance, are connected in series in the connection between capacitor 551 and the anode of SCR 480 and in the connection between capacitor 550 and the anode of SCR 481, respectively. These inductors provide protection for SCR's 526 and 525, respectively, by limiting the rate of current change through these latter SCR's.

The 10 volt positive input pulse previously described is impressed across the control electrode to cathode circuit of SCR's 525 and 526 through isolation diodes 528 and 529, and 530 and 531, respectively. These diodes may be of the 1N2071 type. The anodes of diodes 529 and 531 are connected to the cathodes of SCR's 525 and 526; while the cathodes of diodes 528 and 530 are connected to the control electrodes of these SCR's, respectively. Also, resistor 532, of 22 ohms, is connected between the control electrode and the cathode (via the low current lead) of SCR 525, and resistor 533, of the same resistance, is similarly connected to SCR 526.

SCR's 525 and 526 are energized by a floating power supply, or an equivalent battery, which will now be described. Terminals 535 and 536 are connected to a source of 115 volts alternating current power, such as is employed to operate the system at various voltages in general. The primary of transformer 537 is also connected to these terminals. The secondary thereof has more turns of wire and so effects a step-up voltage to the order of 400 volts each side of a central center tap shown. This tap is connected to the cathodes of SCR's 480 and 481 through two seriesed resistors 538 and 539, each of 51,000 ohms resistance. The center tap is also connected to the cathode of SCR 525 through resistor 540, of 20,000 ohms, and diode 541, of 1N2071 type, with the cathode thereof connected to the resistor. This is the effective connection to the SCR's; resistors 538 and 539 are bleeder resistors. The center tap is further similarly connected through similar resistor 542 and diode 543 to the cathode of SCR 526. The rectifier is completed by resistor 544, of 10 ohms resistance, connected to the upper extremity of the secondary of transformer 537 and diode rectifiers 545 and 546 in series, the anodes toward the resistor and the cathode of the latter rectifier connected to the common return to the cathodes of SCR's 480 and 481; and by resistor 547 and diode rectifiers 548 and 549 in series and similarly connected between the lower extremity of the secondary of transformer 537 and the common return.

A filter is provided by capacitor 550, of 50 microfarads capacitance and 600 volt rating, connected between the cathode of SCR 525 and the common connection to the cathodes of SCR's 480 and 481. The same is also provided by similar capacitor 551, which is connected between the cathode of SCR 526 and the common cathode connection. Resistors 589 and 590 are connected across capacitors 550 and 551, respectively, and form a voltage divider in each case with resistors 540 and 542, respectively. All of these resistors have approximately the same resistance value, so that approximately 200 volts D.C. appears across the capacitors. This is sufficient to turn off SCR's 480 and 481 when SCR's 525 and 526 are made to conduct, even though the alternating current power supply would have just previously been rendered inoperative through some fault; thus the electronic disconnect switch is still enabled to disconnect when so controlled by a valid pulse.

Pulse transformer 522 may be the one-to-one ratio type PE2231, of the Pulse Engineering Co., which type is typical of those employed in this deceleration system.

FIG. 16 is the schematic diagram for the dynamic braking chassis. The several terminals from the secondaries of pulse transformers 172 through 180 in FIG. 3 connect to input terminals in FIG. 16, with the upper terminals in each instance, as 182, connecting to input terminals 608 through 616, and the lower terminals in each instance connecting to input terminals 641 through 649. Terminal 608 connects to Zener diode 636, resistor 619, and thence to the control electrode of SCR 635, which may be of the MCR2604 type.

The cathode of SCR 635 is also connected to resistor 633, the second terminal of which resistor is connected to the control electrode of SCR 620 and to resistor 640. SCR 620 may be the GE 50S type, which will pass a current of 110 amperes. The anode of SCR 620 connects to resistor 621, which, in ture, connect to bus 623 and thence to the right-hand side of the horizontal diagonal of bridge 596. The winding 603 of the vibrating armature of shaker 1, while it is an electrical generator, may be considered as a capacitor charged to a voltage of the order of 200 volts, in a typical embodiment. As the armature decelerates, the voltage reduces, as it would were current drawn from a conventional capacitor.

Resistor 621 represents the highest resistance of a resistor that is shunted across armature winding 603 for deceleration. It has a resistance value of, say, 48 ohms. This is the resistor that is first shunted across the armature to accomplish gradual deceleration, as "Resistor No. 1" in column 4 of Table I.

All of the circuit elements connected to each of terminals 608, 609, 610, etc. are the same as has been detailed above, except for the main resistor corresponding to resistor 621. These may have a sequence of values, such as 48 ohms for resistor 621, 48 ohms for resistor 624, 24 ohms for resistor 625, 12 ohms for resistor 626, 6 ohms for resistor 627, 3 ohms for resistor 628, 1.5 ohms for resistor 629, 0.5 ohm for resistor 630 and 0.25 ohm for resistor 631. While the full current of the armature may be impressed upon one or more of these resistors in parallel, the dissipation for only one resistor is small because of the very short time that is required for deceleration. This is only a small fraction of one second. The current may be as much as 180 amperes, but the period is only for a number of milliseconds. Accordingly, these resistors may be of moderate wattage rating, say five or ten watts.

The remaining elements in each resistor group are employed to provide an indicator lamp for the particular resistor group. This allows the operator to learn which resistors were employed in the automatic action of the controlled deceleration system for any particular deceleration. Thus, the cathode of SCR 635 is connected to indicator lamp 637, and also to resistor 633, which is in series to the control electrode of SCR 620. Resistor 640 is in series with resistor 633 and forms a voltage divider for connection to the control electrode of SCR 620. The resistance of resistor 640 is of the same order as that of resistor 633 and the second terminal of resistor 640 is connected to bus 622. The resistance of resistor 633 is of the order of 100 ohms. SCR 635 may be of the small current type, as the Motorola MCR2604, since a typical current to be passed is 40 milliamperes.

Zener diode 636 is connected with its cathode to terminal 608 and anode to resistor 619. This Zener diode may have a constant voltage rating of the order of 5 volts and performs the function of preventing spurious signals having an amplitude below this voltage from causing SCR 635 to conduct.

Illuminating lamp 637 is connected between the cathode of SCR 635 and a bus 622. The latter is connected to zero voltage, or ground. The anode of SCR 635 is connected to bus 638, which in turn is connected to the positive terminal of positive voltage source, or battery, 639, of 24 volts. When SCR 635 conducts this battery voltage is connected across lamp 637 and causes it to light. The battery voltage also passes through resistor 633 and fires SCR 620, since the resistor is connected to the control electrode of the SCR.

When the selected five of the nine armature-shunting resistor units have been actuated by control from the circuitry actuating pulse transformers in the group 172 through 180 in FIG. 3, it is necessary and desirable that a very low resistance be retained across armature winding 603 until the system is to be restarted upon manual initiation by the operator. To accomplish this he depresses switch 203 in FIG. 4 of this deceleration system and operates the start controls of the vibration system proper. The very low resistance mentioned is provided by resistor 631 of FIG. 16, which is of the order of 0.25 ohm.

Bridge 596 transmits the connection of any of the resistors such as 621 to the armature winding in the following manner.

It will be understood that the armature winding produces an alternating current because of its reciprocatory motion. The deceleration is typically completed within a half cycle of such alternating current. The deceleration apparatus must be constructed to accomplish deceleration on either a positve or a negative half cycle, or any succession of the same. On a positive half cycle the current originating in the armature winding flows from terminal 601, for example, from anode to cathode through diode 598, through resistor 631 from bus 623 to bus 622, from anode to cathode through diode 599 and back to the armature winding through terminal 602. A negative half cycle of current flows from the armature winding through terminal 601, from cathode to anode of diode 597, from bus 622 to bus 623 through resistor 631, from cathode to anode of diode 600, and back to the armature winding through terminal 602. Because of the latching characteristic of the controlling circuits to SCR 620 et al., the resistor(s) remain across the armature winding until the deceleration period is terminated by the operator. This serves to clamp the armature in a fixed position within its range of travel, for the desirable stability of armature and specimen, as has been mentioned.

The dynamic braking chasic of FIG. 16 connects to other elements of the deceleration system in the following manner.

The vibration power input, normally of many kilowatts magnitude, enters this chassis at input terminals 594 and 595. These connect directly to output terminals 484 and 485 of the electronic disconnect switch of FIG. 15. Each of the input terminals connects directly to opposite ends of one diagonal (the vertical) of diode bridge 596; i.e., terminal 594 connects to the cathode of diode 597 and the anode of diode 598, while terminal 595 connects to the cathode of diode 599 and the anode of diode 600. The bridge is completed by a connection between the anodes of diodes 597 and 599 and the cathodes of diodes 598 and 600. Each of these diodes may be a type GE A70S.

During normal vibrational operation, bridge 596 acts as an open circuit between terminals 594 and 595. When deceleration is initiated and is in progress, various resistors are connected across the horizontal diagonal and a corresponding circuit is effective across terminals 601 and 602, to which armature winding 603 is directly connected. Resistors 604 and 605 are connected in series across terminals 601 and 602, with terminal 602 also being grounded. These resistors may have resistances of 1,200 and 150 ohms, respectively, and are for providing a feedback signal to the input of power amplifier 10 of FIG. 1, for the purpose of reducing amplifier distortion.

The apparatus illustrated in the several circuit diagrams has been grouped as to function. In most instances it is physically grouped in a similar manner. However, certain components, such as switch 203 in FIG. 4, the lamps 637 in FIG. 16, etc. are preferably located on a control panel convenient to the operator, which panel also typically houses other known controls for the vibration system per se.

Although numerous specific examples of voltages, currents, resistance and capacitance values, etc. have been given herein to illustrate the invention these have been given by way of example only. Reasonably wide departures may be taken therefrom without departing from the inventive concept. Also, the apparatus of manufacturers other than those mentioned in the interests of specificity may be used.

Certain processes carried out by one means may alternately be carried out by another means, as witness the process of differentiation carried out herein by an operational amplifier and alternately by the known small valued capacitor and resistor combination.

Other modifications of circuit details may also be made, as the use of vacuum tubes instead of transistors, gaseous thyratrons for SCR's, A.C. to D.C. power supplies instead of batteries and the use of inductors in place of resistors in filters. Also, fewer or more inputs to the deceleration system may be used; as to delete the loss of A.C. power input entity and operate the key deceleration circuits on batteries.

The power rating of the decelration system per se is substantially independent of the power rating of the vibration system with which it is employed; except that the power-handling capabilities of the SCR's, the wattage dissipation capability of armature-shunting resistors and components of this type are to be provided with ratings corresponding to the power of the vibration system.

Having thus fully described our invention and the manner in which it is to be practiced, we claim:

1. The method of decelerating the armature of a reciprocatory exciter which includes the steps of;
   (a) continuously sensing the displacement and electrically computing the velocity of said armature with respect to a fixed reference,
   (b) continuously electrically computing the deceleration required to bring said armature to rest within the remaining displacement available on the reciprocatory excursion at the respective instant considered, (c) electrically comparing this deceleration with a selected value of deceleration, (d) electrically initiating only deceleration of said armature when the actual deceleration required is greater than said selected value of deceleration, and (e) automatically increasing electrically the force for producing deceleration as the deceleration of said armature tends to decrease with time, whereby said deceleration is maintained substantially constant.

2. The method of decelerating the armature of a reciprocatory exciter according to claim 1, which additionally includes the steps of;

(a) continuously sensing more than one different type of fault-producing parameter of said moving system, and (b) electrically initiating deceleration of said armature upon a said parameter assuming a fault-producing value.

3. A deceleration control system for a reciprocatory exciter having a moveable armature comprising;

(a) displacement sensing means to continuously form an electrical signal proportional to the displacement of said armature, (b) an electrical computer connected to and coactive with said displacement sensing means to provide an electrical output when the deceleration required to bring said armature to rest from the displacement of that instant exceeds a selected deceleration, (c) a plurality of electrical dissipative means electrically connectable to said armature to decelerate said armature, (d) an electrical controller, (e) energizing means to move said moveable armature, and (f) electrical bridge disconnect means connected to said electrical controller and between said energizing means and said plurality of electrical dissipative means to disconnect said energizing means from said moveable armature and to connect said dissipative means to said armature upon said electrical controller receiving a said output from said electrical computer, (g) said electrical controller connected to said computer to automatically and sequentially effect connection of a plurality of said dissipative means to said armature to decelerate said armature to rest at said selected deceleration.

4. The deceleration control system of claim 3, which additionally includes;

(a) more than one type of fault-detector to sense malenergization of said moveable armature, (b) a connection from each said fault-detector to said energizing means to move said moveable armature for excitation by said energizing means, and (c) an electrical connection from each said fault-detector to said electrical controller to actuate said controller upon a fault signal being produced by a said fault-detector.

5. The deceleration control system of claim 3, which additionally includes a low level velocity device having;

(a) absolute value means to form an electrical signal of one polarity proportional to the absolute value of an alternating electrical signal, said absolute value means connected to said electrical computer, (b) a differential amplifier comparator to produce an electrical output at low levels of velocity of said armature, (c) an electrical connection between said absolute value means and said differential amplifier comparator, and (d) an electrical connection between said differential amplifier comparator and said dissipative means, whereby deceleration is accomplished at low levels of velocity and immobilization of said armature when said deceleration has been completed.

6. The deceleration control system of claim 3 in which said electrical computer comprises;

(a) electrical velocity sensing means to form an electrical signal proportional to the square of the velocity of said armature from the displacement signal of said armature, (b) an electrical connection from said displacement sensing means to said velocity sensing means, (c) electrical acceleration sensing means to form a signal proportional to said selected deceleration, (d) an electrical connection from said displacement sensing means to said accelerating sensing means, (e) an electrical comparator to produce an electrical output when the amplitude of the signal from said velocity sensing means related to the instantaneous position of said armature exceeds the amplitude of the sinal from said acceleration sensing means, and (f) electrical connections from said velocity sensing means and said acceleration sensing means to said comparator with mutually opposite electrical polarities.

7. The deceleration control system of claim 6 in which said electrical comparator includes;

(a) a first comparator having polarity components to produce an electrical output when the polarities of the signals from said velocity sensing means and said acceleration sensing means are negative, (b) a second comparator having polarity components to produce an electrical output when the polarities of the signals from said velocity sensing means and said acceleration sensing means are positive, and (c) electrical connections from both said velocity sensing means and said acceleration sensing means to both said first comparator and to said second comparator.

8. The deceleration control system of claim 7 in which said electrical comparator further includes;

(a) a first level detector connected to said first comparator, (b) a second level detector connected to said second comparator, and (c) an electrical gate connected to both of said level detectors to produce an output from said electrical computer upon receiving an output from either of said level detectors.

9. The deceleration control system of claim 3 in which said electrical controller comprises;

(a) electrical means to produce alternating electrical energy proportional to the velocity of said moveable armature, (b) an absolute value device to form a voltage of a single polarity proportional to said alternating electrical energy, said absolute value device connected to said electrical means to produce alternating electrical energy, (c) a first plurality of voltage-sensitive means having different thresholds, each to produce an electrical output when said voltage of single polarity decreases below the threshold of the particular voltage-sensitive means involved, said absolute value device connected to each of said voltage-sensitive means, (d) a second plurality, larger than said first plurality, of multiple throw switches to select said selected deceleration, said switches connected to said first plurality of voltage-sensitive means in the order of decreasing value of said threshold, and (e) a said second plurality of electrical gates, each said gate connected to a said multiple throw switch and all said gates also connected to said electrical computer, to enable an output when an output is received from said electrical computer, for thereby providing an output from only a said first plurality of said gates.

10. The deceleration control system of claim 9 in which said electrical controller further includes a differentiator and level detector comprising;
 (a) electrical differentiating means having an input and an output to form an alternating electrical signal proportional to the derivative of an electrical signal,
 (b) an electrical connection from a fault-detector of said deceleration control system to the input of said differentiating means,
 (c) oppositely-biased Schmidt triggers connected to the output of said differentiating means, and
 (d) an OR gate connected to said Schmidt triggers to provide an output from said differentiator and level detector to said electrical controller.

11. The deceleration control system of claim 9 in which said electrical controller further includes an overtravel detector and disconnect signal generator comprising;
 (a) voltage means to form an overtravel signal,
 (b) a connection from said voltage means to said reciprocatory exciter,
 (c) a NAND gate having plural inputs, and an output to said electrical controllers,
 (d) an electrical connection from said voltage means to one input of said NAND gate, and
 (e) a connection from said electrical computer to another input of said NAND gate,
  whereby a disconnect signal is generated when an overtravel signal is produced.

12. The deceleration controller system of claim 9 in which said electrical controller further includes a power failure detector comprising;
 (a) a rectifier connected to that electric power circuit which supplies electric power to said deceleration controller system,
 (b) a low pass filter having an adjustable time constant connected to said rectifier, and
 (c) a triggerable relaxation device connected to said filter, and to said electrical controller,
  whereby the absence of electric power in said circuit causes said relaxation device to be triggered.

13. The deceleration control system of claim 3 in which said electrical disconnect means comprises;
 (a) a diode bridge having four arms,
 (b) energizing means to apply vibration-producing electric power connected to said bridge,
 (c) said moveable armature electrically connected to said bridge across a first diagonal from said energizing means to apply vibrational electric power,
 (d) controllable conductive means connected across the second diagonal of said bridge, and
 (e) a connection from at least said electrical controller to said controllable conductive means to terminate conduction of said controllable conductive means,
  thereby to disconnect said energizing means to apply vibration-producing electric power from said moveable armature.

14. The deceleration control system of claim 13 which additionally includes;
 (a) further controllable conductive means,
 (b) an electrical connection between said further controllable conductive means and at least said electrical controller for initiating conduction of said further controllable conductive means, and
 (c) an electrical connection between said further controllable conductive means and said controllable conductive means to accept electric current from said controllable conductive means,
  thereby to cause said controllable conductive means to cease conducting.

15. The deceleration control system of claim 14 which additionally includes;
 (a) inductive means interposed between said controllable conductive means and said diode bridge in said second diagonal of said bridge,
  whereby electric current is initially constrained to flow between said controllable conductive means and said further controllable conductive means upon said further controllable conductive means being rendered conductive.

16. The deceleration control system of claim 3, in which the circuit of said plurality of electrical dissipative means includes;
 (a) a symmetrical diode bridge electrically connected across electro-magnetic means upon said moveable armature,
 (b) the same plurality of controllable means as said plurality of electrical dissipative means,
  each said plurality of controllable conductive means connected to one of said electrical dissipative means,
 (c) a connection from all of the thus connected said electrical dissipative means and all of said controllable conductive means to said symmetrical diode bridge diagonally opposite to the connection thereof to said electro-magnetic means, and
 (d) a connection from said electrical controller to each of said controllable conductive means for causing selective conduction of said controllable conductive means by said electrical controller,
  whereby the said electrical dissipative means connected to each said selected controllable conductive means is electrically connected across said electro-magnetic means for the deceleration of said armature.

17. The deceleration control system of claim 16 which additionally includes;
 (a) a second plurality of controllable conductive means,
 (b) an electrical indicator connected to each of said second plurality of controllable conductive means for control thereby, and
 (c) an additional connection from said electrical controller to each of said second plurality of controllable conductive means,
  whereby a said indicator is energized upon a corresponding said electrical dissipative means being electrically connected across said electro-magnetic means for the deceleration of said armature.

References Cited

UNITED STATES PATENTS

| | | | |
|---|---|---|---|
| 3,277,355 | 10/1966 | Troatman et al. | 318—28 |
| 3,007,095 | 10/1961 | Usher | 318—132 |
| 2,523,142 | 9/1950 | Riley | 318—88 |
| 3,012,180 | 12/1961 | Finvold | 318—28 X |
| 2,767,363 | 10/1956 | Chubb | 318—369 X |
| 3,249,841 | 5/1966 | Liebeuthal | 318—363 |
| 3,051,942 | 8/1962 | Galman. | |
| 3,331,239 | 7/1967 | Lausen et al. | 318—128 XR |
| 2,714,185 | 7/1955 | Woodruff | 318—18 XR |
| 3,040,224 | 6/1962 | Piltz et al. | 317—16 XR |
| 3,056,910 | 10/1962 | Hajian | 318—128 |
| 3,007,095 | 10/1961 | Usher | 317—16 |
| 3,045,476 | 7/1962 | Bell | 318—128 XR |
| 2,935,672 | 5/1960 | Ross | 318—128 |
| 2,935,671 | 5/1960 | Ross | 317—19 XR |
| 2,844,777 | 7/1958 | Ross | 318—128 |

WARREN E. RAY, Primary Examiner

B. A. REYNOLDS, Assistant Examiner

U.S. Cl. X.R.

317—16; 318—18, 133, 134